US012418765B2

(12) United States Patent
Onishi et al.

(10) Patent No.: US 12,418,765 B2
(45) Date of Patent: Sep. 16, 2025

(54) INFORMATION PROCESSING APPARATUS, INFORMATION PROCESSING TERMINAL, INFORMATION PROCESSING METHOD, AND PROGRAM

(71) Applicant: Sony Group Corporation, Tokyo (JP)

(72) Inventors: Takuto Onishi, Tokyo (JP); Masahiko Koizumi, Tokyo (JP); Chihiro Sugai, Tokyo (JP); Taiki Endo, Tokyo (JP); Koyuru Okimoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 270 days.

(21) Appl. No.: 18/024,461

(22) PCT Filed: Aug. 27, 2021

(86) PCT No.: PCT/JP2021/031450
§ 371 (c)(1),
(2) Date: Mar. 2, 2023

(87) PCT Pub. No.: WO2022/054603
PCT Pub. Date: Mar. 17, 2022

(65) Prior Publication Data
US 2024/0031758 A1 Jan. 25, 2024

(30) Foreign Application Priority Data

Sep. 10, 2020 (JP) .................. 2020-152417

(51) Int. Cl.
*H04S 7/00* (2006.01)
(52) U.S. Cl.
CPC .......... *H04S 7/303* (2013.01); *H04S 2420/01* (2013.01)
(58) Field of Classification Search
CPC . H04S 7/303; H04S 7/304; H04S 7/40; H04S 2420/01
(Continued)

(56) References Cited

U.S. PATENT DOCUMENTS 9,584,653 B1 * 2/2017 Lyren .................. G06F 3/04842
9,900,555 B1 * 2/2018 Barreto .................. H04N 7/142
(Continued)

FOREIGN PATENT DOCUMENTS

JP H11-331992 A 11/1999
JP 2006-287878 A 10/2006
(Continued)

OTHER PUBLICATIONS

International Search Report and English translation thereof mailed Nov. 16, 2021 in connection with International Application No. PCT/JP2021/031450.

*Primary Examiner* — William A Jerez Lora
(74) *Attorney, Agent, or Firm* — Wolf, Greenfield & Sacks, P.C.

(57) ABSTRACT

The present technique relates to an information processing apparatus, an information processing terminal, an information processing method, and a program which enable a sound content in accordance with an action by a participant in a conversation to be output in an immersive state. An information processing apparatus according to an aspect of the present technique includes: a storage unit configured to store HRTF data corresponding to a plurality of positions based on a listening position; and a sound image localization processing unit configured to provide, by performing sound image localization processing using the HRTF data selected in accordance with an action by a specific participant among participants of a conversation having participated via a network, a sound content selected in accordance with the action so that a sound image is localized at a prescribed position. The present technology can be applied to a computer which conducts a remote conference.

16 Claims, 27 Drawing Sheets

(58) Field of Classification Search
USPC ..................................................... 381/1, 303
See application file for complete search history.

(56) References Cited

U.S. PATENT DOCUMENTS

| | | | | |
|---|---|---|---|---|
| 11,714,595 | B1* | 8/2023 | Libin | ........................ H04N 7/15 |
| | | | | 704/235 |
| 2008/0144794 | A1 | 6/2008 | Gardner | |
| 2015/0373477 | A1 | 12/2015 | Norris et al. | |
| 2018/0367937 | A1 | 12/2018 | Asada et al. | |
| 2021/0321212 | A1* | 10/2021 | Li | ........................... H04S 7/303 |
| 2023/0216965 | A1* | 7/2023 | Nguyen | .............. H04M 1/6058 |
| | | | | 455/416 |

FOREIGN PATENT DOCUMENTS

| | | | |
|---|---|---|---|
| JP | 2014-011509 A | 1/2014 | |
| WO | WO 2017/061218 A1 | 4/2017 | |

* cited by examiner

Fig. 12

PARTICIPANT INFORMATION

- USER INFORMATION
- POSITIONAL INFORMATION
- SETTING INFORMATION (SUCH AS BACKGROUND SOUND)
- VOLUME INFORMATION

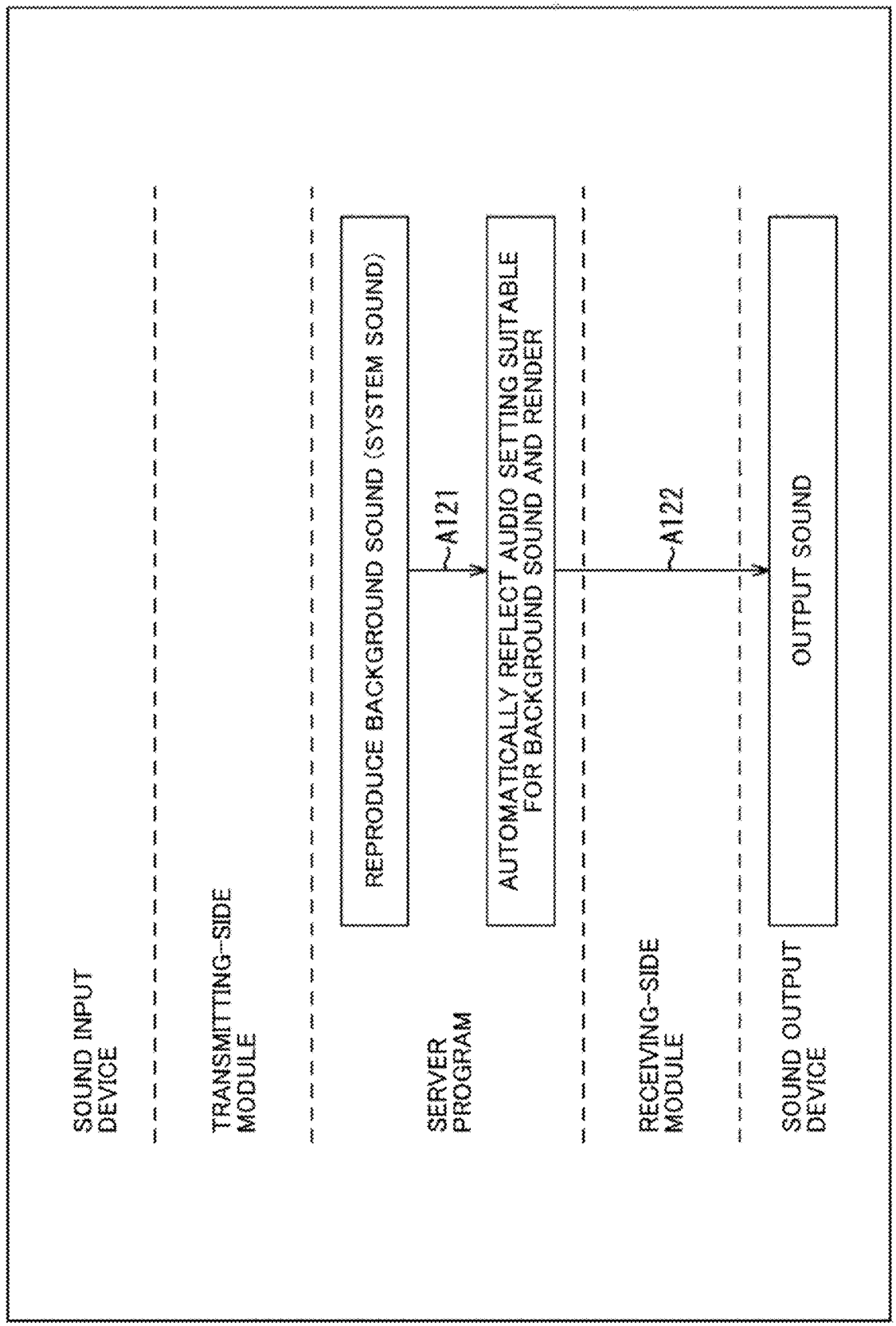

INFORMATION PROCESSING APPARATUS, INFORMATION PROCESSING TERMINAL, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/031450, filed in the Japanese Patent Office as a Receiving Office on Aug. 27, 2021, which claims priority to Japanese Patent Application Number JP2020-152417, filed in the Japanese Patent Office on Sep. 10, 2020, each of which is hereby incorporated by reference in its entirety.

TECHNICAL FIELD

The present technique particularly relates to an information processing apparatus, an information processing terminal, an information processing method, and a program which enable a sound content in accordance with an action by a participant in a conversation to be output in an immersive state.

BACKGROUND ART

So-called remote conferencing in which a plurality of participants at remote locations conduct a conference using apparatuses such as PCs are gaining popularity. By starting up a Web browser or a dedicated application installed in a PC and accessing an access destination designated by an URL allocated to each conference, a user informed of the URL can take part in a conference as a participant.

A voice of a participant collected by a microphone is transmitted via a server to an apparatus used by another participant and output from headphones or a speaker. In addition, video taken by a camera and capturing a participant is transmitted via a server to an apparatus used by another participant and displayed on a display of the apparatus.

Accordingly, each participant can engage in a conversation while looking at the faces of other participants.

CITATION LIST

Patent Literature

[PTL 1]
JP H11-331992 A

SUMMARY

Technical Problem

Since one's own utterance is shared by all other participants, a participant is unable to individually designate a specific participant and engage in conversation with only the designated participant.

Conversely, the participant is unable to listen to contents of an utterance by a specific participant by solely focusing on the utterance.

While a scene in which a specific participant is engaging in action may be visually presented by screen display when a virtual action function such as a hand-raising function is used, it is difficult to make out which participant is engaged in the action.

The present technique has been made in view of such a situation and enables a sound content in accordance with an action by a participant in a conversation to be output in an immersive state.

Solution to Problem

An information processing apparatus according to an aspect of the present technique includes: a storage unit configured to store HRTF data corresponding to a plurality of positions based on a listening position; and a sound image localization processing unit configured to provide, by performing sound image localization processing using the HRTF data selected in accordance with an action by a specific participant among participants of a conversation having participated via a network, a sound content selected in accordance with the action so that a sound image is localized at a prescribed position.

An information processing terminal according to another aspect of the present technique includes: a sound receiving unit configured to: store HRTF data corresponding to a plurality of positions based on a listening position; receive a sound content obtained by performing sound image localization processing and having been transmitted from an information processing apparatus configured to provide, by performing the sound image localization processing using the HRTF data selected in accordance with an action by a specific participant among participants of a conversation having participated via a network, the sound content selected in accordance with the action so that a sound image is localized at a prescribed position; and output a sound.

In an aspect of the present technique, HRTF data corresponding to a plurality of positions based on a listening position is stored and, by performing sound image localization processing using the HRTF data selected in accordance with an action by a specific participant among participants of a conversation having participated via a network, a sound content selected in accordance with the action is provided so that a sound image is localized at a prescribed position.

In another aspect of the present technique, HRTF data corresponding to a plurality of positions based on a listening position is stored, a sound content obtained by performing sound image localization processing is received, the sound content having been transmitted from an information processing apparatus providing, by performing the sound image localization processing using the HRTF data selected in accordance with an action by a specific participant among participants of a conversation having participated via a network, the sound content selected in accordance with the action so that a sound image is localized at a prescribed position, and a sound is output.

BRIEF DESCRIPTION OF DRAWINGS

FIG. 12 is a diagram showing an example of participant information.

FIG. 27 is a diagram showing a flow of processing related to management of acoustic settings.

DESCRIPTION OF EMBODIMENTS

A mode for carrying out the present technique will be described below. The description will be given in the following order.

1. Configuration of tele-communication system
2. Basic operations
3. Configuration of each apparatus
4. Use case of sound image localization
5. Modifications Configuration of Tele-Communication System FIG. 1 is a diagram showing a configuration example of a tele-communication system according to an embodiment of the present technique.

Figure 1:
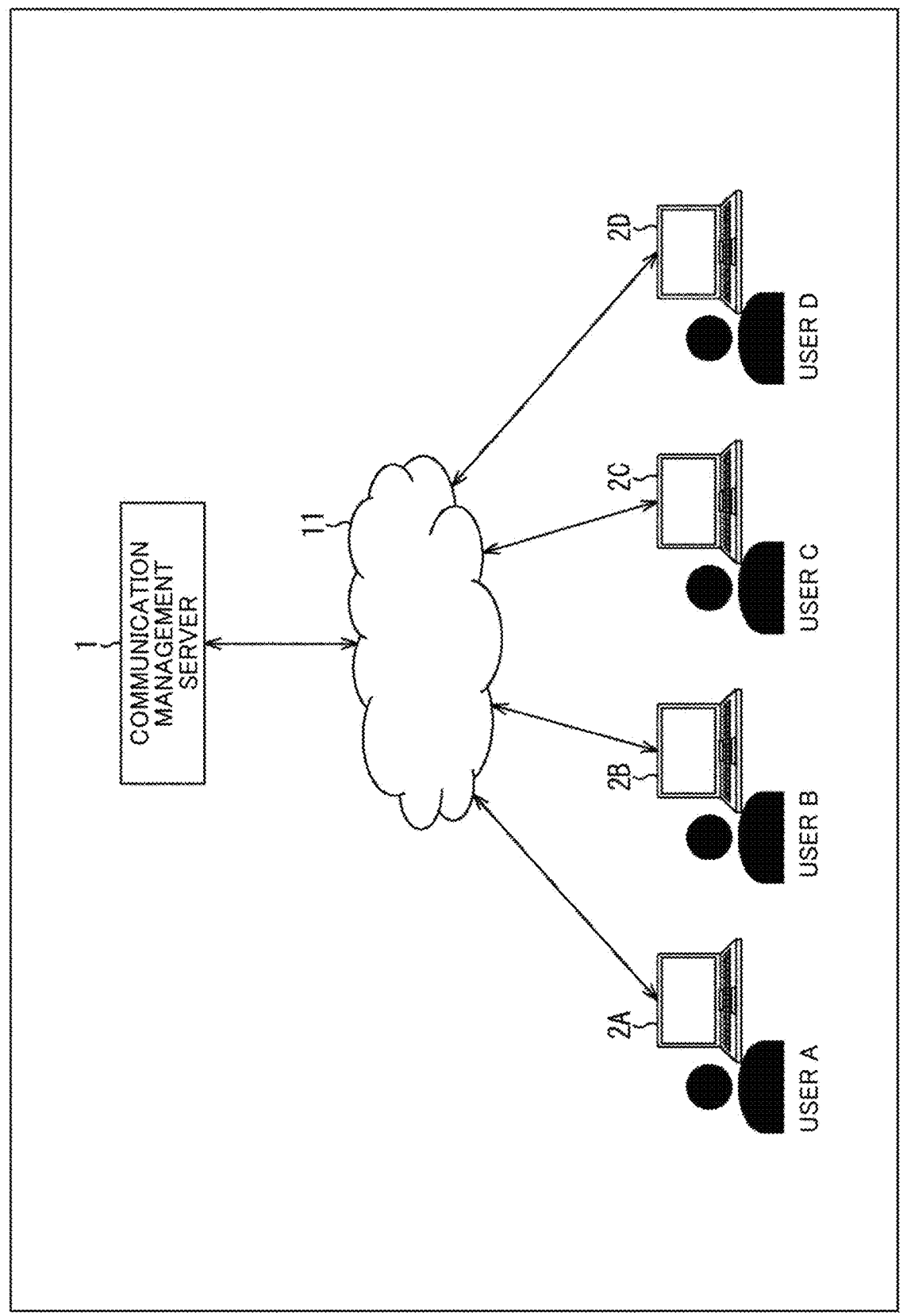
FIG. 1 is a diagram showing a configuration example of a tele-communication system according to an embodiment of the present technique.

A tele-communication system shown in FIG. 1 is configured by connecting, to a communication management server 1, a plurality of client terminals used by participants of a conference via a network 11 such as the Internet. The example in FIG. 1 shows client terminals 2A to 2D being PCs as client terminals used by users A to D being participants of a conference.

Other devices such as a smartphone or a tablet terminal including a sound input device such as a microphone (mic) and a sound output device such as headphones or a speaker may be used as client terminals. When the client terminals 2A to 2D need not be distinguished from each other, the client terminals will be referred to as a client terminal 2 when appropriate.

The users A to D are users to participate in a same conference. Note that the number of users to participate in the conference is not limited to four.

The communication management server 1 manages a conference which is conducted by a plurality of users by engaging in conversation on-line. The communication management server 1 is an information processing apparatus which controls transmission and reception of sound among the client terminals 2 to manage a so-called remote conference.

Figure 2:
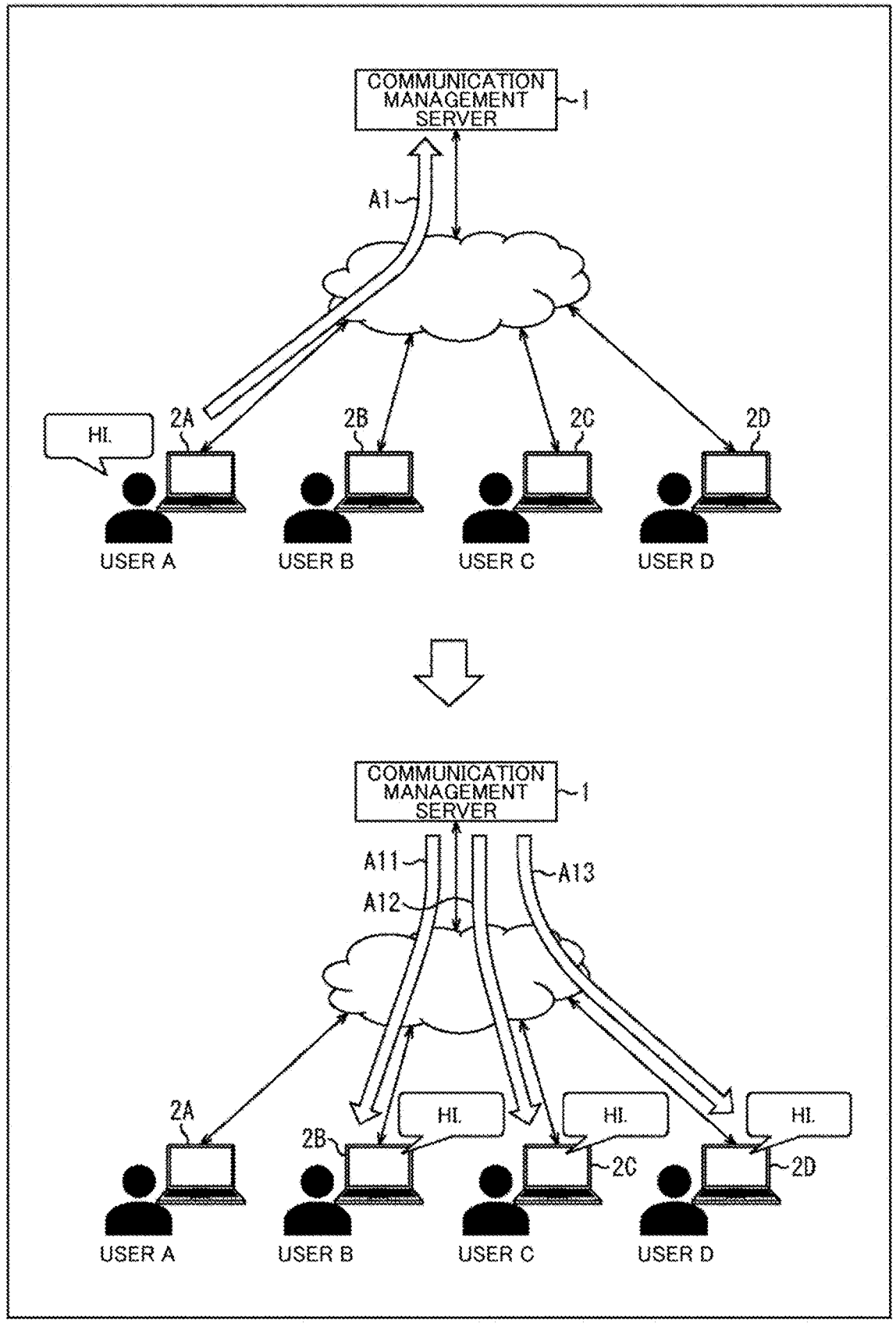
FIG. 2 is a diagram showing an example of transmission/reception of sound data.

For example, as depicted by an arrow A1 in an upper part of FIG. 2, the communication management server 1 receives sound data of the user A transmitted from the client terminal 2A in accordance with the user A making an utterance. Sound data of the user A collected by a mic provided in the client terminal 2A is transmitted from the client terminal 2A.

The communication management server 1 transmits the sound data of the user A to each of the client terminals 2B to 2D as depicted by arrows A11 to A13 in a lower part of FIG. 2 and causes the client terminals 2B to 2D to output a voice of the user A. When the user A makes an utterance as an utterer, the users B to D become listeners. Hereinafter, a user to become an utterer will be referred to as an uttering user and a user to become a listener will be referred to as a listening user.

Similarly, when another user makes an utterance, sound data transmitted from the client terminal 2 used by the uttering user is transmitted to the client terminal 2 used by a listening user via the communication management server 1.

The communication management server 1 manages a position of each user in a virtual space. The virtual space is, for example, a three-dimensional space virtually set up as a location for conducting a conference. A position in the virtual space is represented by three-dimensional coordinates.

Figure 3:
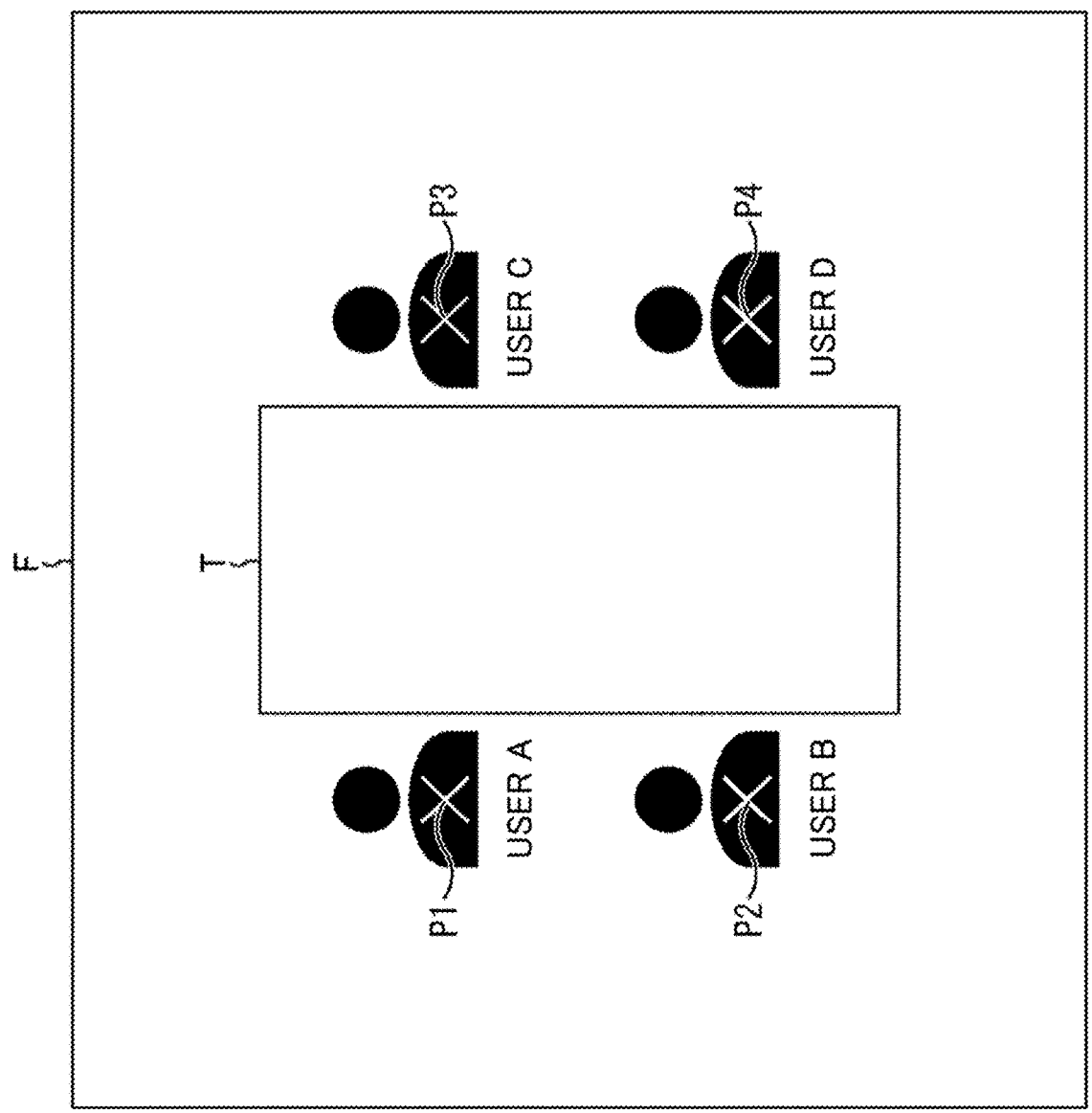
FIG. 3 is a plan view showing an example of a position of a user in a virtual space.

FIG. 3 is a plan view showing an example of a position of a user in the virtual space.

In the example shown in FIG. 3, a longitudinally-long rectangular table T is arranged at approximately center of the virtual space indicated by a rectangular frame F, and positions P1 to P4 being positions around the table T are respectively set as positions of the users A to D. A front direction of each user is a direction of the table T from the position of each user.

Figure 4:
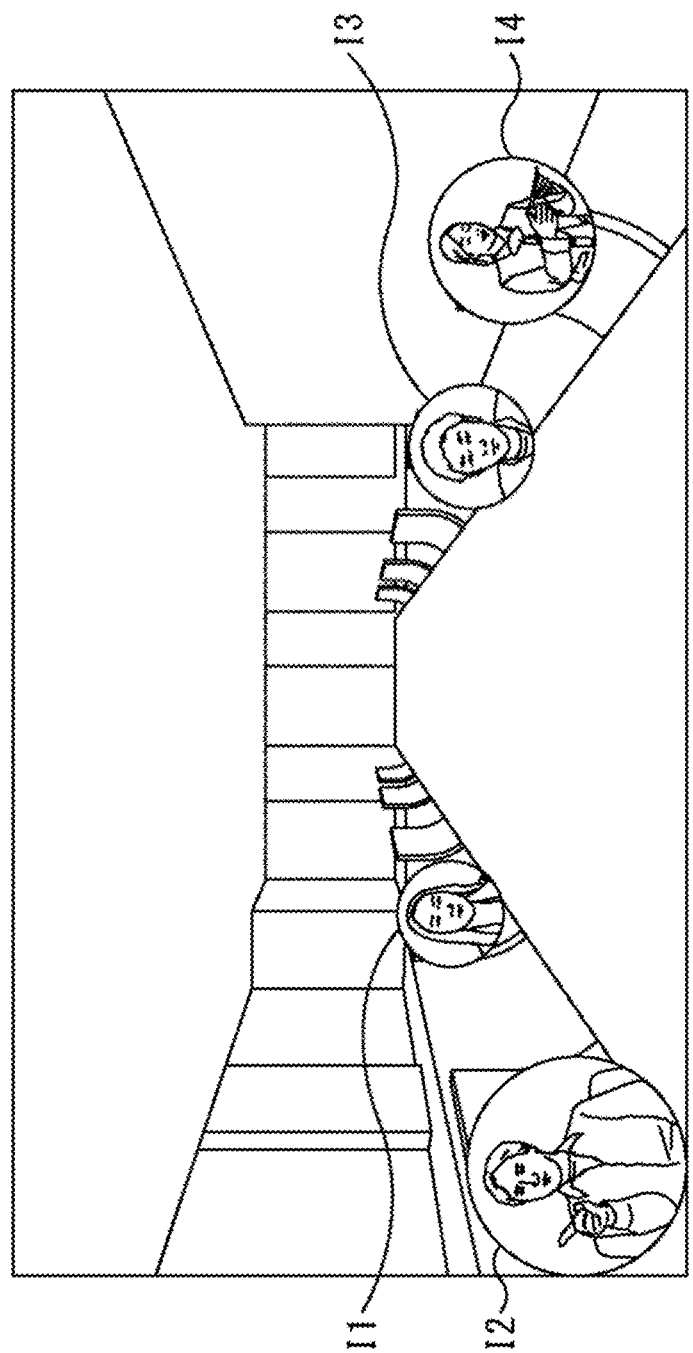
FIG. 4 is a diagram showing a display example of a remote conference screen.

During a conference, as shown in FIG. 4, a screen of the client terminal 2 used by each user displays a participant icon which is information visually representing the user superimposed on a background image representing a location where the conference is conducted. A position of a participant icon on the screen is a position in accordance with a position of each user in the virtual space.

In the example shown in FIG. 4, a participant icon is configured as a circular image including a face of a user. A participant icon is displayed in a size in accordance with a distance from a reference position set in the virtual space to the position of each user. Participant icons I1 to I4 respectively represent users A to D.

For example, the position of each user is automatically set by the communication management server 1 when the user participates in a conference. The position of a user in the virtual space may be set by the user himself/herself by moving a participant icon on the screen shown in FIG. 4.

The communication management server 1 has HRTF data being data of an HRTF (Head-Related Transfer Function) representing transfer characteristics of sound from a plurality of positions to a listening position when each position in the virtual space is adopted as the listening position. HRTF data corresponding to a plurality of positions based on each listening position in the virtual space is prepared in the communication management server 1.

The communication management server 1 performs sound image localization processing using HRTF data with respect to sound data so that a voice of the uttering user is heard by each listening user from the position of the uttering user in the virtual space and transmits sound data obtained by performing the sound image localization processing.

The sound data transmitted to the client terminal 2 as described above is sound data obtained by performing sound image localization processing in the communication management server 1. The sound image localization processing includes rendering such as VBAP (Vector Based Amplitude Panning) based on positional information and binaural processing using HRTF data.

In other words, a voice of each uttering user is processed by the communication management server 1 as sound data of object audio. Channel-based audio data of, for example two channels including L/R channels generated by the sound image localization processing in the communication management server 1 is transmitted from the communication management server 1 to each client terminal 2 and a voice of the uttering user is output from headphones or the like provided in the client terminal 2.

Performing sound image localization processing using HRTF data in accordance with a relative positional relationship between a position of a listening user himself/herself and a position of an uttering user enables each listening user to perceive that the voice of the uttering user is being heard from the position of the uttering user.

Figure 5:
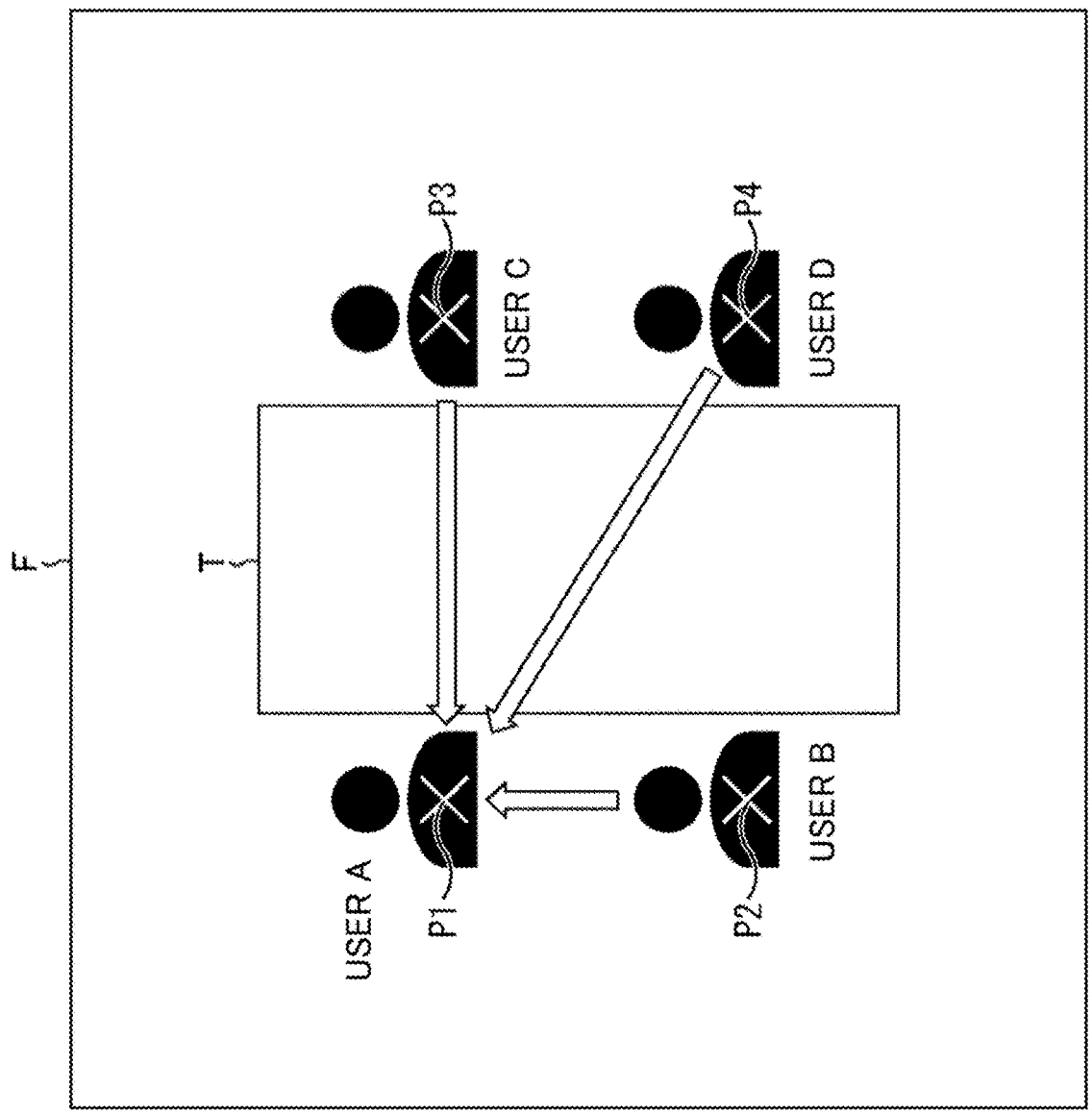
FIG. 5 is a diagram showing an example of how a voice is heard.

FIG. 5 is a diagram showing an example of how a voice is heard.

Focusing on the user A for which the position P1 is set as a position thereof in the virtual space as a listening user, a voice of the user B is heard from immediately to the right as depicted by an arrow in FIG. 5 by performing sound image localization processing based on HRTF data between the positions P2 and P1 with the position P2 as a sound source position. The front of the user A engaged in a conversation with his/her face facing the client terminal 2A is a direction of the client terminal 2A.

In addition, a voice of the user C is heard from the front by performing sound image localization processing based on HRTF data between the positions P3 and P1 with the position P3 as a sound source position. A voice of the user D is heard from rear right by performing sound image localization processing based on HRTF data between the positions P4 and P1 with the position P4 as a sound source position.

Figure 6:
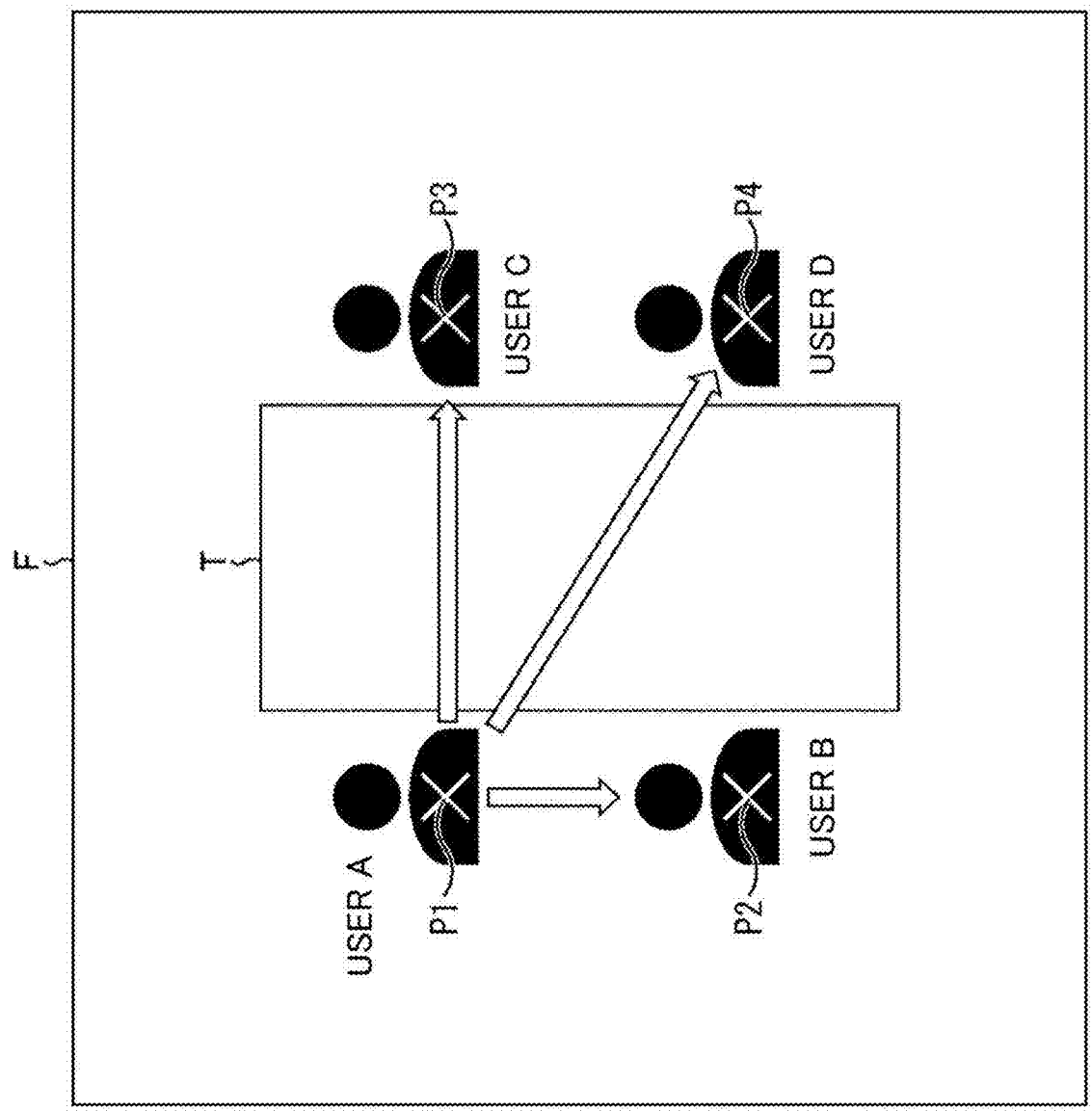
FIG. 6 is a diagram showing another example of how a voice is heard.

A similar description applies when another user is the listening user. For example, as shown in FIG. 6, a voice of the user A is heard from immediately to the left by the user B engaged in a conversation with his/her face facing the client terminal 2B but the voice of the user A is heard from the front by the user C engaged in a conversation with his/her face facing the client terminal 2C. In addition, the voice of the user A is heard from rear right by the user D engaged in a conversation with his/her face facing the client terminal 2D.

In this manner, in the communication management server 1, sound data for each listening user is generated in accordance with a positional relationship between a position of the listening user and the position of the uttering user and used to output a voice of the uttering user. The sound data transmitted to each listening user is sound data which sounds differently in accordance with a positional relationship between the position of each listening user and the position of an uttering user.

Figure 7:
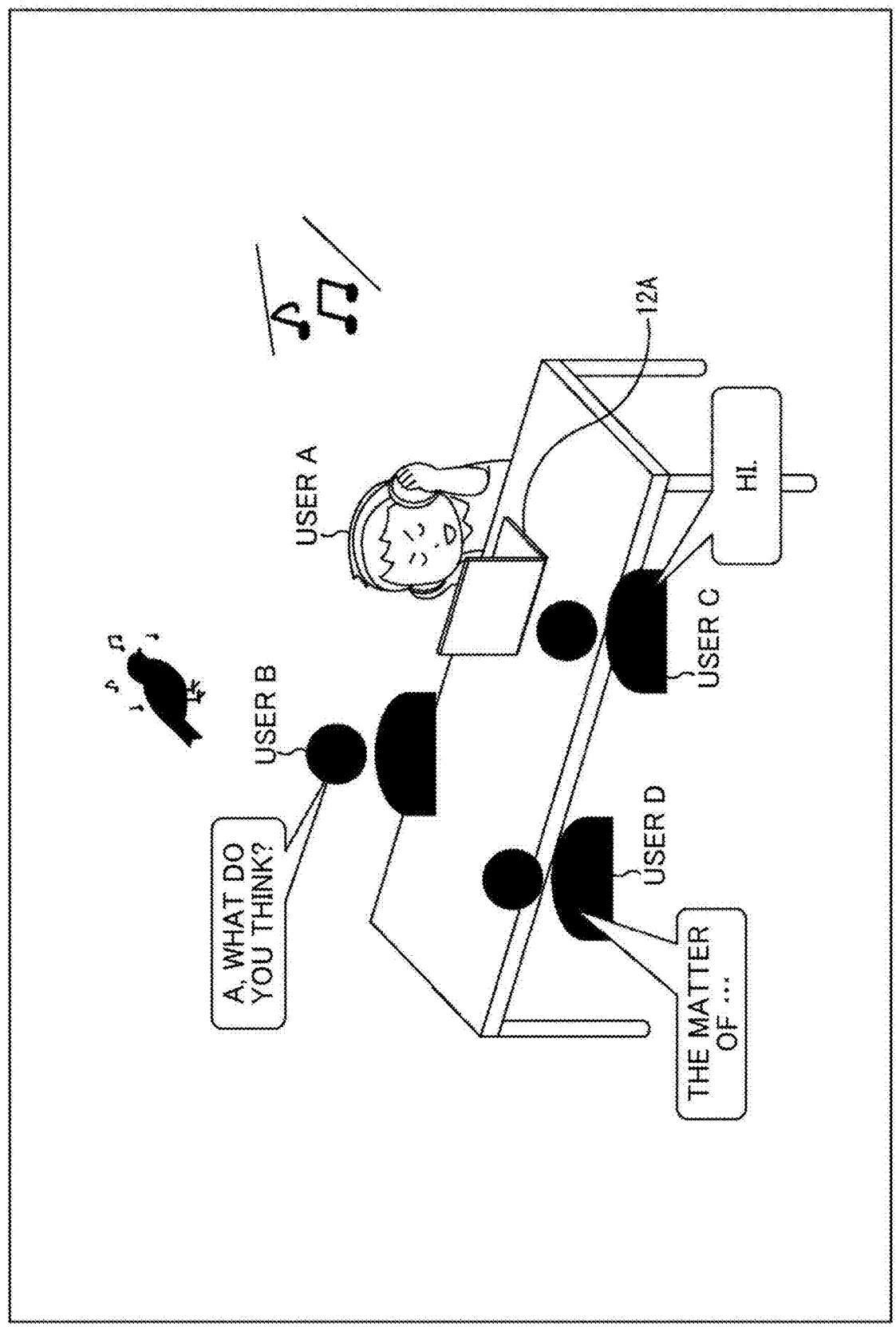
FIG. 7 is a diagram showing a situation of a user participating in a conference.

FIG. 7 is a diagram showing a situation of a user participating in a conference.

For example, the user A participating in the conference wearing headphones is to engage in conversation while listening to voices of the users B to D having sound images localized at respective positions of immediately to the right, the front, and rear right. As described with reference to FIG. 5 and the like, based on the position of the user A, the positions of the users B to D are, respectively, positions immediately to the right, the front, and rear right. Note that the users B to D being shown colored in FIG. 7 represent that the users B to D are not actually present in a same space as the space where the user A is conducting the conference.

As will be described later, background sound such as chirping of a bird or BGM is also output based on sound data obtained by sound image localization processing so that a sound image is localized at a prescribed position.

Sound adopted as a processing object by the communication management server 1 includes sounds such as environmental sound and background sound in addition to uttered voices. Hereinafter, when types of sound need not be distinguished from each other, sound adopted as a processing object by the communication management server 1 will be simply described as a sound when appropriate. In reality, a sound adopted as a processing object by the communication management server 1 includes sound types other than a voice.

Since the voice of an uttering user is heard from a position in accordance with a position in a virtual space, even when there are a plurality of participants, a listening user can readily distinguish voices of the respective users. For example, even when a plurality of users make utterances at the same time, a listening user can distinguish voices of the respective users.

In addition, since the voice of an uttering user is perceived three-dimensionally, a listening user can attain a sensation from the voice that the uttering user is actually present at a position of a sound image. The listening user can engage in a conversation in an immersive state with other users.

Basic Operations

A flow of basic operations of the communication management server 1 and the client terminal 2 will now be described.

<Operation of Communication Management Server 1>

Figure 8:
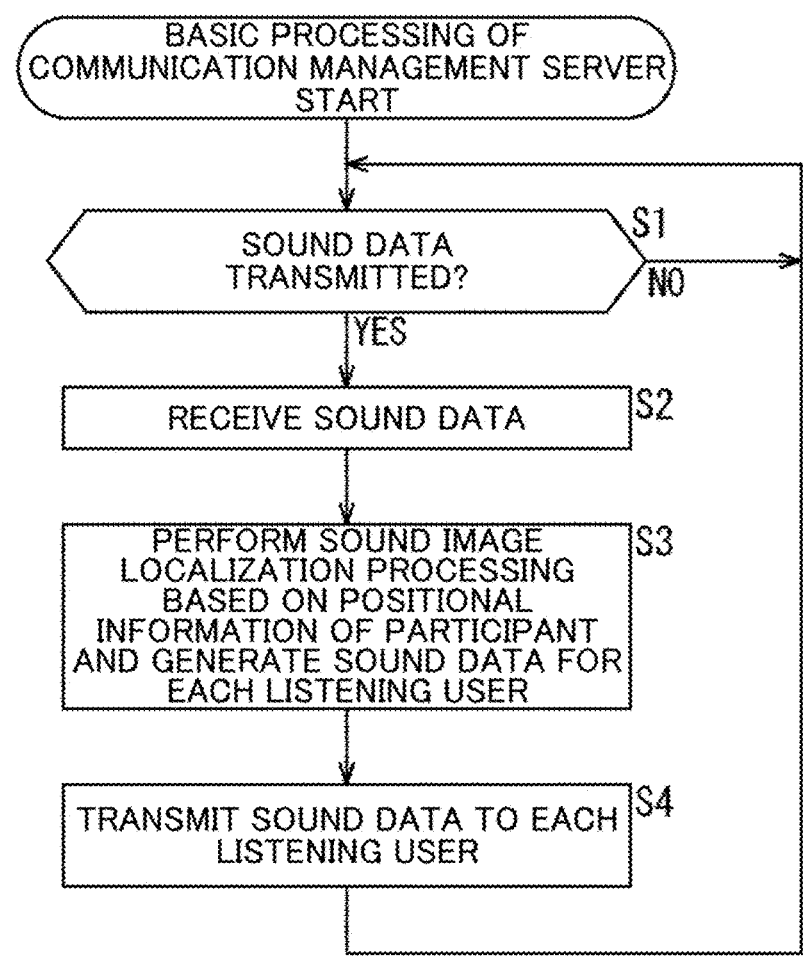
FIG. 8 is a flowchart explaining basic processing by a communication management server.

Basic processing of the communication management server 1 will be described with reference to a flowchart shown in FIG. 8.

In step S1, the communication management server 1 determines whether or not sound data has been transmitted from the client terminal 2 and stands by until it is determined that sound data has been transmitted.

When the communication management server 1 determines in step S1 that sound data has been transmitted from the client terminal 2, in step S2, the communication management server 1 receives sound data transmitted from the client terminal 2.

In step S3, the communication management server 1 performs sound image localization processing based on positional information of each user and generates sound data for each listening user.

For example, the sound data for the user A is generated such that, based on the position of the user A, a sound image of the voice of the uttering user is localized at a position in accordance with the position of the uttering user.

In addition, the sound data for the user B is generated such that, based on the position of the user B, a sound image of the voice of the uttering user is localized at a position in accordance with the position of the uttering user.

Sound data for other listening users is similarly generated based on positions of the listening users using HRTF data in accordance with a relative positional relationship with the position of the uttering user. The pieces of sound data for the respective listening users are pieces of data which differ from each other.

In step S4, the communication management server 1 transmits sound data to each listening user. The processing steps described above are performed every time sound data is transmitted from the client terminal 2 used by the uttering user.

<Operation of Client Terminal 2>

Figure 9:
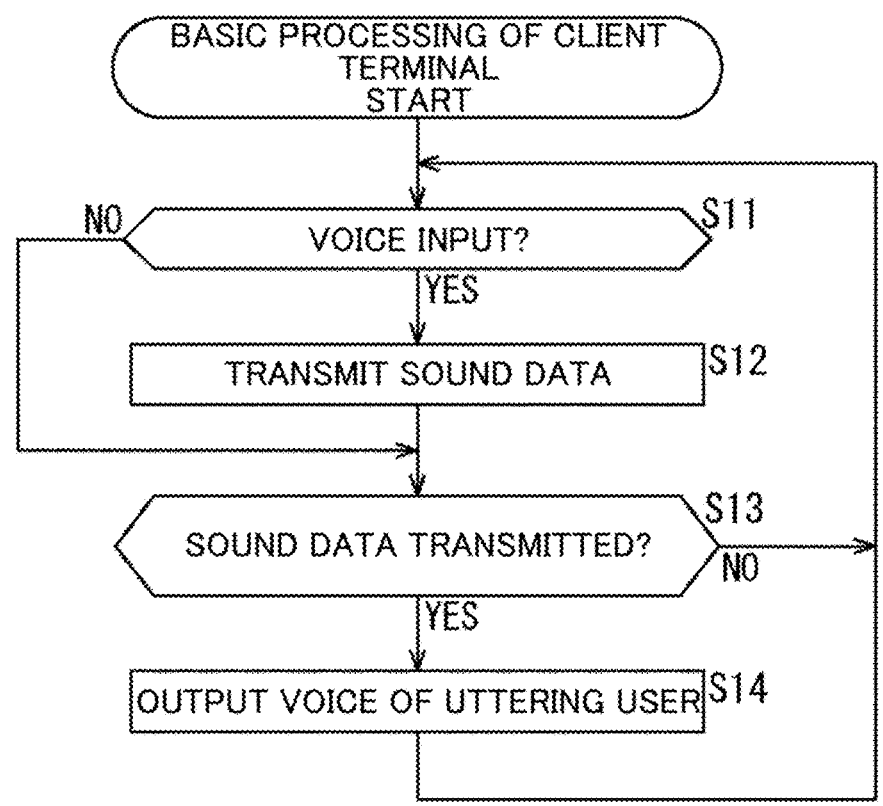
FIG. 9 is a flowchart explaining basic processing by a client terminal.

Basic processing of the client terminal 2 will be described with reference to a flowchart shown in FIG. 9.

In step S11, the client terminal 2 determines whether or not a mic sound has been input. A mic sound refers to a sound collected by a mic provided in the client terminal 2.

When the client terminal 2 determines in step S11 that a mic sound has been input, in step S12, the client terminal 2 transmits the sound data to the communication management server 1. When it is determined in step S11 that a mic sound has not been input, processing of step S12 is skipped.

In step S13, the client terminal 2 determines whether or not sound data has been transmitted from the communication management server 1.

When it is determined in step S13 that sound data has been transmitted, in step S14, the communication management server 1 receives the sound data and outputs a voice of the uttering user.

After the voice of the uttering user is output or when it is determined in step S13 that the sound data has not been transmitted, a return is made to step S11 and the processing steps described above are repeated.

Configuration of Each Apparatus

<Configuration of Communication Management Server 1>

Figure 10:
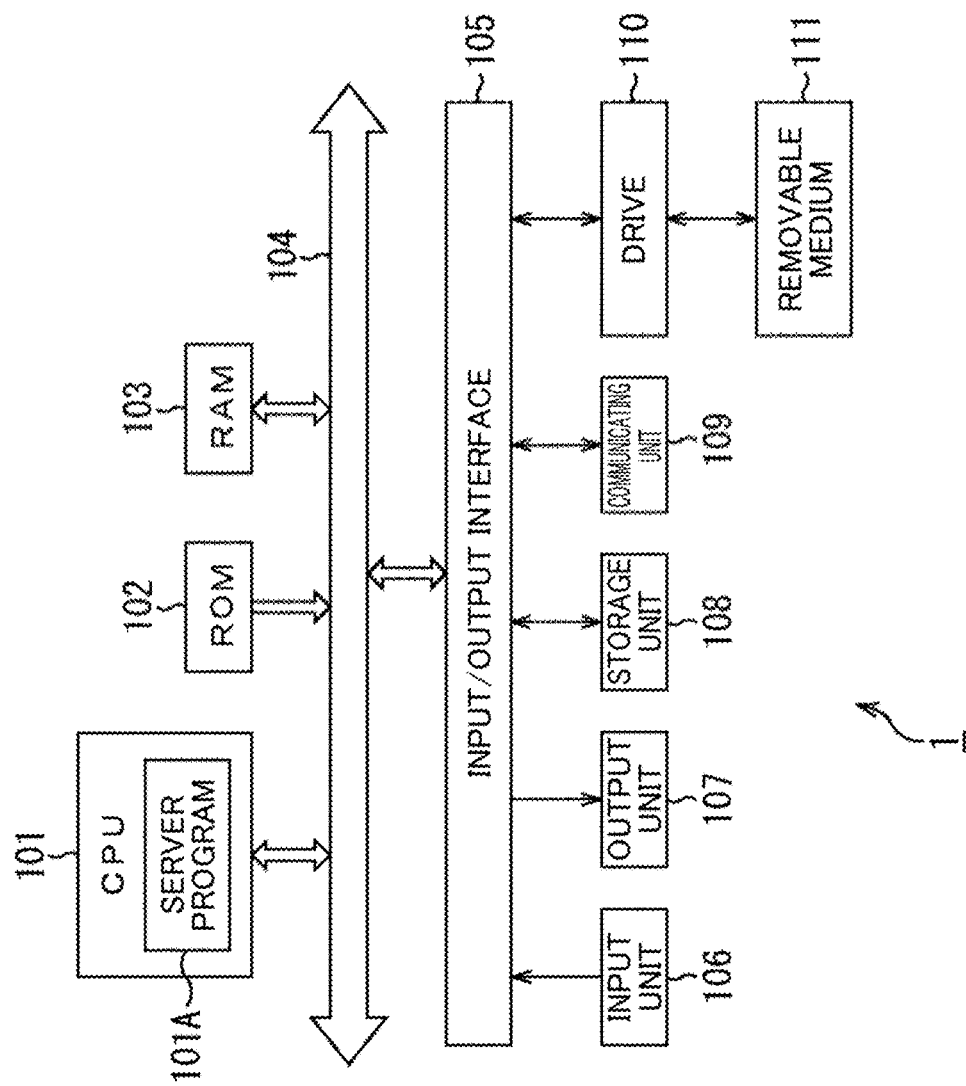
FIG. 10 is a block diagram showing a hardware configuration example of the communication management server.

FIG. 10 is a block diagram showing a hardware configuration example of the communication management server 1.

The communication management server 1 is constituted of a computer. The communication management server 1 may be constituted of a single computer configured as shown in FIG. 10 or constituted of a plurality of computers.

A CPU 101, a ROM 102, and a RAM 103 are connected to each other by a bus 104. The CPU 101 controls an operation of the entire communication management server 1 by executing a server program 101A. The server program 101A is a program for realizing a tele-communication system.

An input/output interface 105 is further connected to the bus 104. An input unit 106 constituted of a keyboard, a mouse, or the like, and an output unit 107 constituted of a display, a speaker, or the like are connected to the input/output interface 105.

In addition, a storage unit 108 constituted of a hard disk, a nonvolatile memory, or the like, a communicating unit 109 constituted of a network interface or the like, and a drive 110 that drives a removable medium 111 are connected to the input/output interface 105. For example, the communicating unit 109 communicates with the client terminal 2 used by each user via the network 11.

Figure 11:
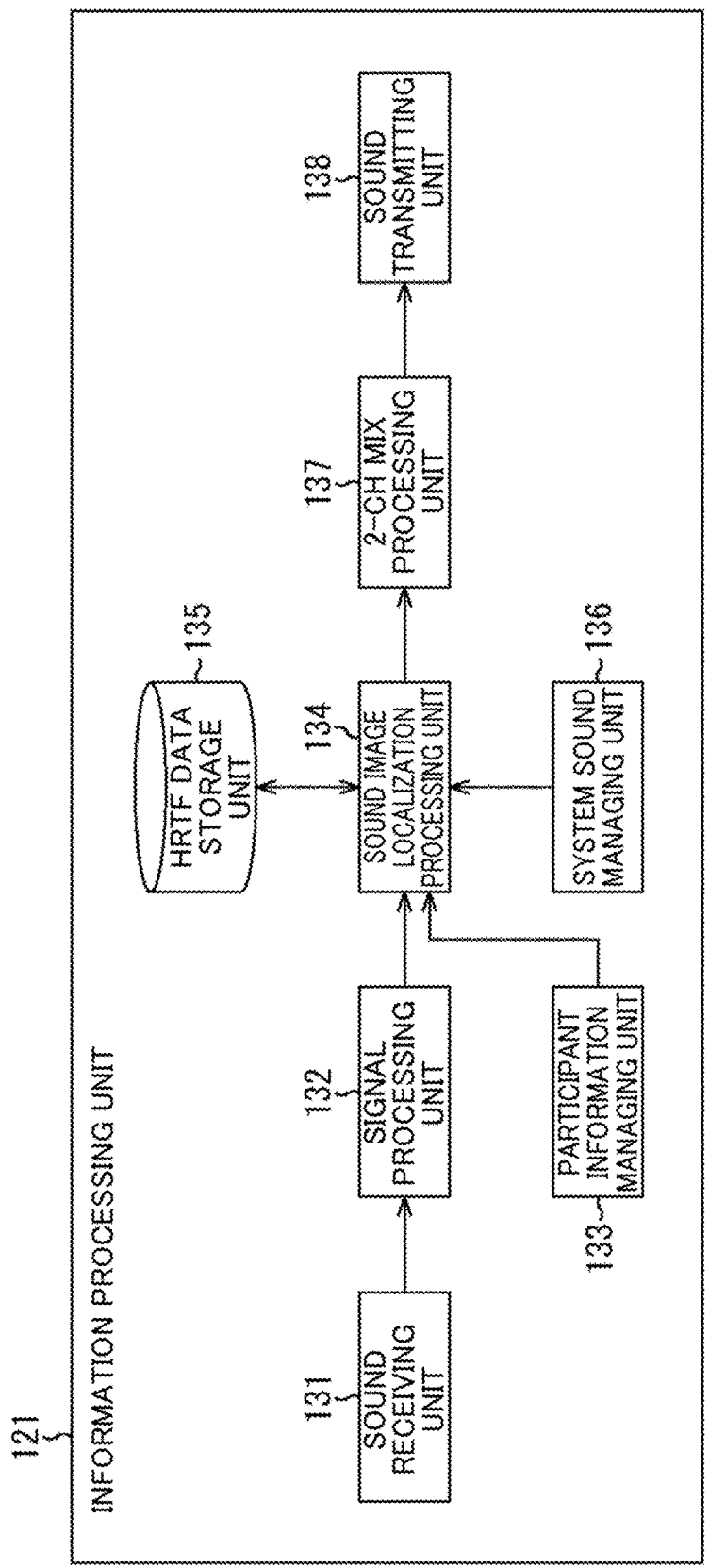
FIG. 11 is a block diagram showing a functional configuration example of the communication management server.

FIG. 11 is a block diagram showing a functional configuration example of the communication management server 1. At least some of the functional units shown in FIG. 11 are realized by the CPU 101 shown in FIG. 10 by executing the server program 101A.

An information processing unit 121 is realized in the communication management server 1. The information processing unit 121 is constituted of a sound receiving unit 131, a signal processing unit 132, a participant information managing unit 133, a sound image localization processing unit 134, an HRTF data storage unit 135, a system sound managing unit 136, a 2-ch mix processing unit 137, and a sound transmitting unit 138.

The sound receiving unit 131 controls the communicating unit 109 and receives sound data transmitted from the client terminal 2 used by the uttering user. Sound data received from the sound receiving unit 131 is output to the signal processing unit 132.

The signal processing unit 132 appropriately applies predetermined signal processing on the sound data supplied from the sound receiving unit 131 and outputs sound data obtained by applying the signal processing to the sound image localization processing unit 134. For example, processing of separating the voice of the uttering user from environmental sound is performed by the signal processing unit 132. Other than the voice of the uttering user, the mic sound includes environmental sound such as noise in a space where the uttering user is present.

The participant information managing unit 133 controls the communicating unit 109 and manages participant information which is information related to participants of a conference by communicating with client terminals 2 and the like.

FIG. 12 is a diagram showing an example of participant information.

As shown in FIG. 12, participant information includes user information, positional information, setting information, and volume information.

User information refers to information on a user to participate in a conference set up by a given user. For example, user information includes an ID of the user. For example, other information included in participant information is managed in association with user information.

Positional information refers to information representing a position of each user in virtual space.

Setting information refers to information representing contents of settings of a conference such as a setting of background sound to be used during the conference.

Volume information refers to information representing a volume when outputting the voice of each user.

Participant information managed by the participant information managing unit 133 is supplied to the sound image localization processing unit 134. The participant information managed by the participant information managing unit 133 is also supplied to the system sound managing unit 136, the 2-ch mix processing unit 137, the sound transmitting unit 138, and the like when appropriate. In this manner, the participant information managing unit 133 functions as a position managing unit which manages a position of each user in virtual space and also functions as a background sound managing unit which manages a setting of background sound.

Based on positional information supplied from the participant information managing unit 133, the sound image localization processing unit 134 reads and acquires HRTF data in accordance with a positional relationship of each user from the HRTF data storage unit 135. The sound image localization processing unit 134 performs sound image localization processing using the HRTF data read from the HRTF data storage unit 135 with respect to the sound data supplied from the signal processing unit 132 and generates sound data for each listening user.

In addition, the sound image localization processing unit 134 performs sound image localization processing using predetermined HRTF data on data of a system sound supplied from the system sound managing unit 136. The system sound is a sound which is generated on the side of the communication management server 1 to be heard by a listening user together with the voice of the uttering user. For example, the system sound includes a background sound such as BGM or sound effects. The system sound is a sound which differs from the voices of users.

In other words, in the communication management server 1, sounds other than the voice of the uttering user such as background sound and sound effects are subject to processing as object audio. Sound image localization processing for localizing a sound image at a prescribed position in virtual space is also performed on sound data of the system sound. For example, sound image localization processing for localizing a sound image at a position farther than the positions of participants is performed on sound data of background sound.

The sound image localization processing unit 134 outputs sound data obtained by performing sound image localization processing to the 2-ch mix processing unit 137. Sound data of the uttering user and, when appropriate, sound data of the system sound are output to the 2-ch mix processing unit 137.

The HRTF data storage unit 135 stores pieces of HRTF data corresponding to a plurality of positions based on respective listening positions in the virtual space.

The system sound managing unit 136 manages the system sound. The system sound managing unit 136 outputs sound data of the system sound to the sound image localization processing unit 134.

The 2-ch mix processing unit 137 performs 2-ch mix processing with respect to sound data supplied from the sound image localization processing unit 134. By performing the 2-ch mix processing, channel-based audio data including components of an audio signal L and an audio signal R of each of the voice of the uttering user and the system sound is generated. The sound data obtained by performing the 2-ch mix processing is output to the sound transmitting unit 138.

The sound transmitting unit 138 controls the communicating unit 109 and transmits the sound data supplied from the 2-ch mix processing unit 137 to the client terminal 2 used by each listening user.

<Configuration of Client Terminal 2>

Figure 13:
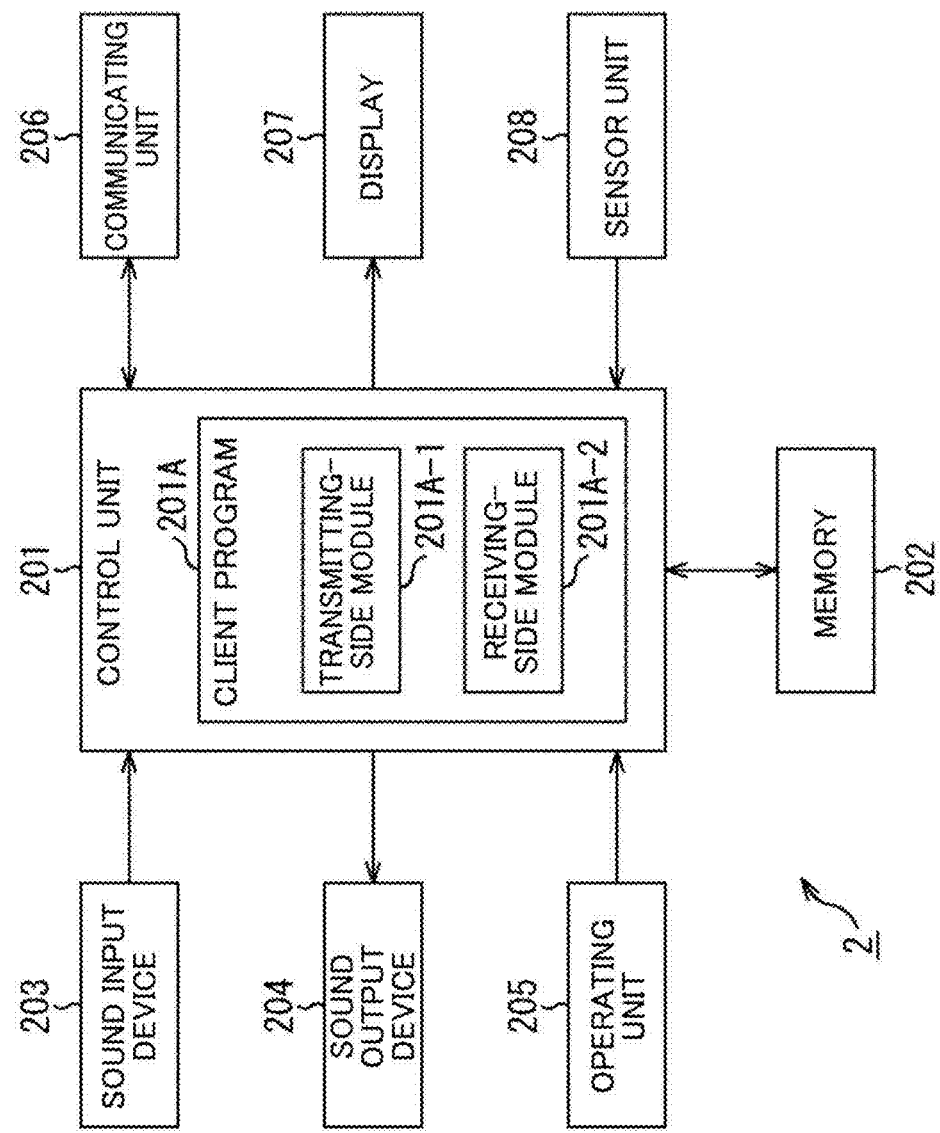
FIG. 13 is a block diagram showing a hardware configuration example of a client terminal.

FIG. 13 is a block diagram showing a hardware configuration example of the client terminal 2.

The client terminal 2 is configured by connecting, with respect to a control unit 201, a memory 202, a sound input device 203, a sound output device 204, an operating unit 205, a communicating unit 206, a display 207, and a sensor unit 208.

The control unit 201 is constituted of a CPU, a ROM, a RAM, and the like. The control unit 201 controls an operation of the entire client terminal 2 by executing a client program 201A. The client program 201A is a program for using the tele-communication system managed by the communication management server 1. The client program 201A includes a transmitting-side module 201A-1 which executes processing on a transmitting side and a receiving-side module 201A-2 which executes processing on a receiving side.

The memory 202 is constituted of a flash memory or the like. The memory 202 stores various kinds of information such as the client program 201A to be executed by the control unit 201.

The sound input device 203 is constituted of a microphone. Sound collected by the sound input device 203 is output to the control unit 201 as a mic sound.

The sound output device 204 is constituted of a device such as headphones or a speaker. The sound output device 204 outputs voices of the participants of a conference and the like based on an audio signal supplied from the control unit 201.

Hereinafter, when appropriate, a description will be given assuming that the sound input device 203 is a mic. In addition, a description will be given assuming that the sound output device 204 is headphones.

The operating unit 205 is constituted of various buttons or a touch panel provided superimposed on the display 207. The operating unit 205 outputs information representing contents of an operation by a user to the control unit 201.

The communicating unit 206 is a communication module which accommodates wireless communication by a mobile communication system such as 5G communication or a communication module which accommodates wireless LAN or the like. The communicating unit 206 receives radio waves output from a base station and communicates with various apparatuses such as the communication management server 1 via the network 11. The communicating unit 206 receives information transmitted from the communication management server 1 and outputs the information to the control unit 201. In addition, the communicating unit 206 transmits information supplied from the control unit 201 to the communication management server 1.

The display 207 is constituted of an organic EL display, an LCD, or the like. Various screens including a remote conference screen are to be displayed on the display 207.

The sensor unit 208 is constituted of various sensors such as an RGB camera, a depth camera, a gyro sensor, and an acceleration sensor. The sensor unit 208 outputs sensor data obtained by performing a measurement to the control unit 201. Recognition of a state of users and the like are appropriately performed based on the sensor data measured by the sensor unit 208.

Figure 14:
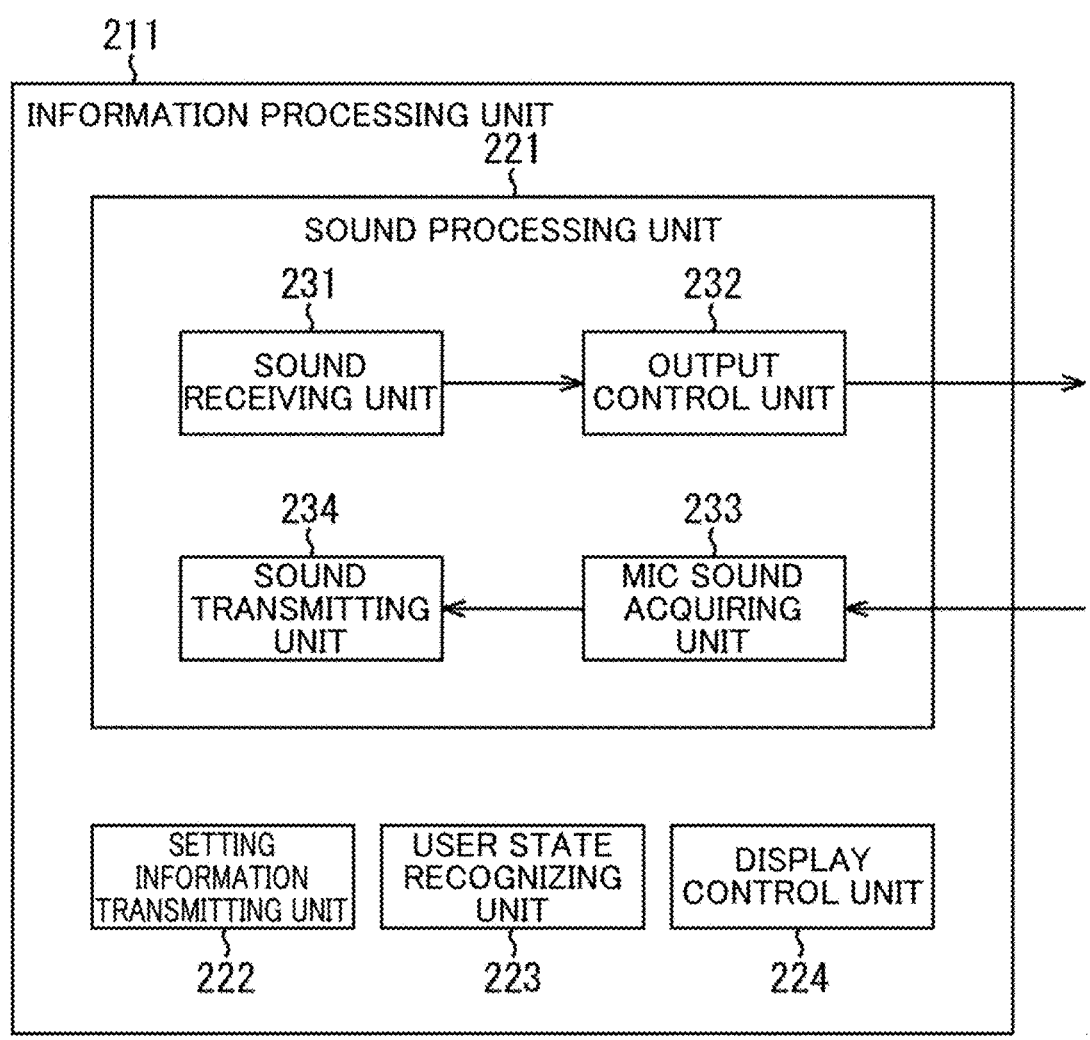
FIG. 14 is a block diagram showing a functional configuration example of a client terminal.

FIG. 14 is a block diagram showing a functional configuration example of the client terminal 2. At least a part of the functional units shown in FIG. 14 is realized by the control unit 201 shown in FIG. 13 by executing the client program 201A.

An information processing unit 211 is realized in the client terminal 2. The information processing unit 211 is constituted of a sound processing unit 221, a setting information transmitting unit 222, a user state recognizing unit 223, and a display control unit 224.

The information processing unit 211 includes a sound receiving unit 231, an output control unit 232, a mic sound acquiring unit 233, and a sound transmitting unit 234.

The sound receiving unit 231 controls the communicating unit 206 and receives sound data transmitted from the communication management server 1. The sound data received by the sound receiving unit 231 is supplied to the output control unit 232.

The output control unit 232 causes a sound in accordance with the sound data transmitted from the communication management server 1 to be output from the sound output device 204.

The mic sound acquiring unit 233 acquires sound data of a mic sound collected by the mic constituting the sound input device 203. Sound data of the mic sound acquired by the mic sound acquiring unit 233 is supplied to the sound transmitting unit 234.

The sound transmitting unit 234 controls the communicating unit 206 and transmits sound data of the mic sound supplied from the mic sound acquiring unit 233 to the communication management server 1.

The setting information transmitting unit 222 generates setting information representing contents of various settings in accordance with an operation by a user. The setting information transmitting unit 222 controls the communicating unit 206 and transmits the setting information to the communication management server 1.

The user state recognizing unit 223 recognizes a state of a user based on sensor data measured by the sensor unit 208. The user state recognizing unit 223 controls the communicating unit 206 and transmits information representing a state of a user to the communication management server 1.

The display control unit 224 communicates with the communication management server 1 by controlling the communicating unit 206 and causes a remote conference screen to be displayed on the display 207 based on information transmitted from the communication management server 1.

Use Case of Sound Image Localization

A use case of sound image localization of various sounds including an uttered voice by a participant of a conference will be described.

<Virtual Reaction Function>

A virtual reaction function is a function used when communicating one's own response to another user. For example, an applause function which is a virtual reaction function is prepared for a remote conference realized by the communication management server 1. An instruction to use the applause function to output sound effects of applause is issued from a screen displayed as a GUI on the display 207 of the client terminal 2.

Figure 15:
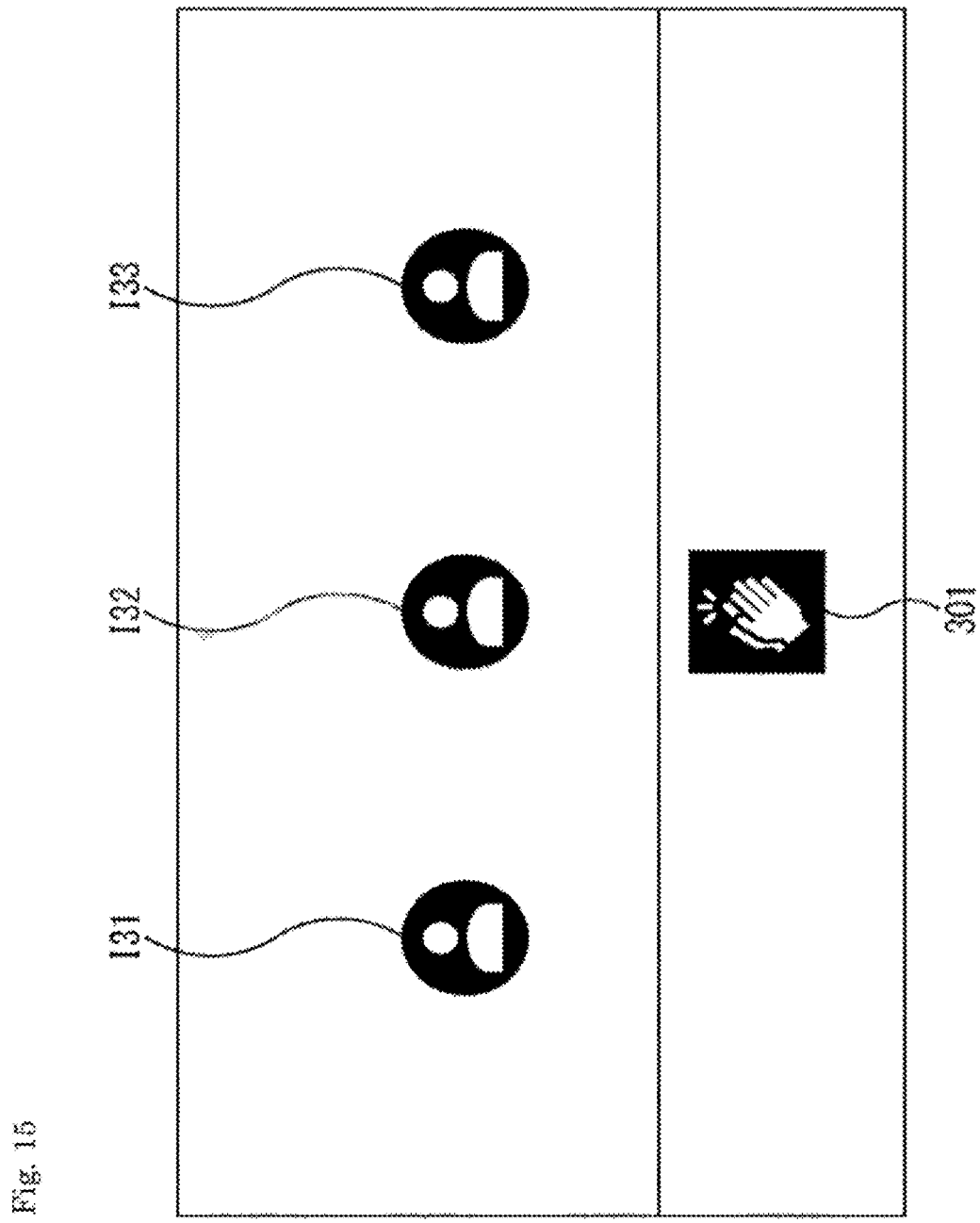
FIG. 15 is a diagram showing an example of a remote conference screen.

FIG. 15 is a diagram showing an example of a remote conference screen.

The remote conference screen shown in FIG. 15 displays participant icons 131 to 133 representing users participating in a conference. Assuming that the remote conference screen shown in FIG. 15 is a screen displayed on the client terminal 2A used by the user A, the participant icons 131 to 133 respectively represent users B to D. The participant icons 131 to 133 are displayed at positions corresponding to positions of the users B to D in virtual space.

A virtual reaction button 301 is displayed below the participant icons 131 to 133. The virtual reaction button 301 is a button which is depressed when issuing an instruction to output sound effects of applause. A similar screen is also displayed on the client terminals 2 used by the users B to D.

Figure 16:
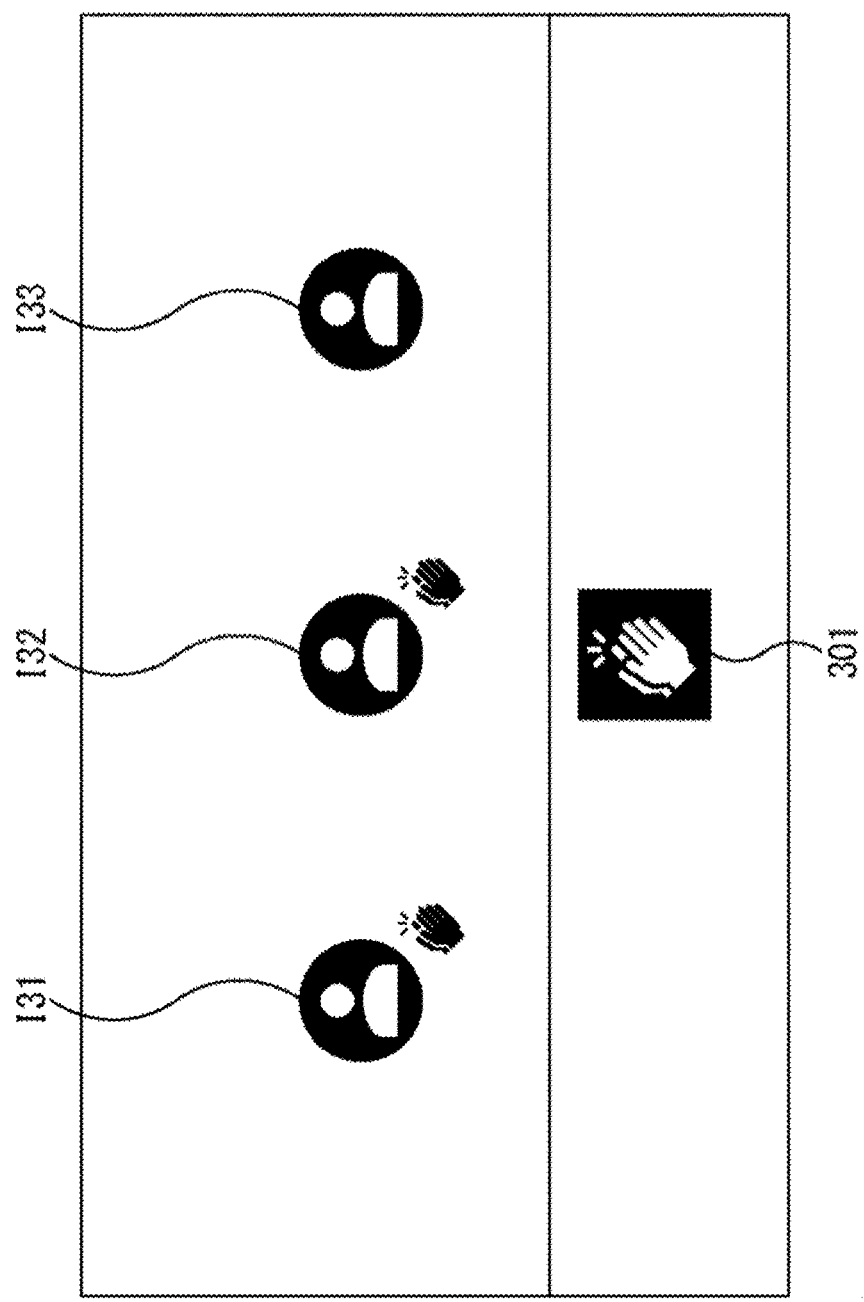
FIG. 16 is a diagram showing an example of a remote conference screen.

For example, when the user B and the user C depress the virtual reaction button 301, as shown in FIG. 16, an icon representing the use of the applause function by the user B and the user C is displayed next to the participant icon 131 and the participant icon 132.

In addition, sound effects of applause is reproduced as a system sound by the communication management server 1 and delivered to each listening user together with a voice of the uttering user. Sound image localization processing for localizing a sound image at a prescribed position is also performed with respect to sound data of sound effects of applause.

Figure 17:
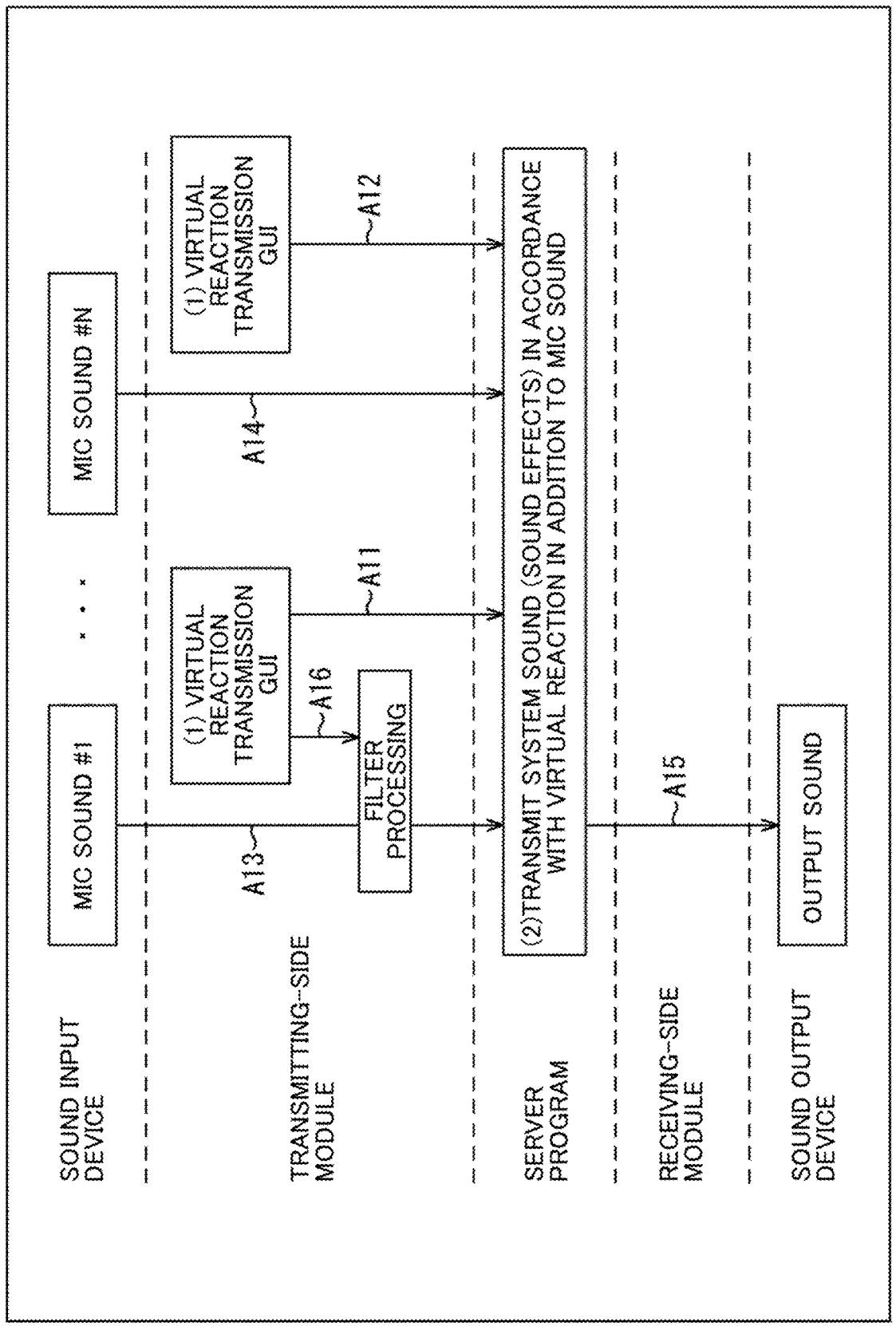
FIG. 17 is a diagram showing a flow of processing related to output of sound effects using a virtual reaction function.

FIG. 17 is a diagram showing a flow of processing related to output of sound effects using the virtual reaction function.

When the virtual reaction button 301 is depressed, operation information representing that an instruction to output sound effects of applause has been issued is transmitted from the client terminals 2 to the communication management server 1 as indicated by arrows A11 and A12.

When mic sounds are transmitted from the client terminals 2 as indicated by arrows A13 and A14, the sound effects of applause are added to a mic sound in the communication management server 1 and sound image localization processing using HRTF data in accordance with a positional relationship is respectively performed with respect to sound data of the uttering user and sound data of the sound effects.

For example, sound image localization processing for localizing a sound image at a same position as a position of a user having issued an instruction to output sound effects of applause is performed with respect to sound data of the sound effects. In this case, a sound image of the sound effects of applause is to be perceived localized at the same position as the position of the user having issued an instruction to output the sound effects of applause.

When there are a plurality of users having issued an instruction to output sound effects of applause, sound image localization processing for localizing a sound image at a position of a center of gravity of the positions of the plurality of users having issued the instruction to output the sound effects of applause is performed on the sound data of the sound effects. In this case, the sound image of the sound effects of applause is to be perceived localized at a position where the users having issued an instruction to output the sound effects of applause are densely present. Instead of the position of a center of gravity, the sound image of the sound effects of applause can be localized at various positions selected based on the positions of the users having issued an instruction to output the sound effects of applause.

The sound data generated by the sound image localization processing is transmitted to the client terminal 2 used by each listening user as indicated by an arrow A15 and output from the client terminal 2.

In this example, when an instruction to output sound effects of applause is issued by a specific user, HRTF data for localizing a sound image of the sound effects of applause at a prescribed position is selected in accordance with an action such as execution of the applause function. In addition, based on sound data obtained by the sound image localization processing using the selected HRTF data, sound effects of applause is provided to each listening user as a sound content.

In FIG. 17, each of the mic sounds #1 to #N shown in an uppermost section using a plurality of blocks represents a voice of the uttering user detected by different client terminals 2. In addition, sound output shown in a lowermost section using a single block represents output at the client terminal 2 used by one listening user.

As shown on a left side in FIG. 17, for example, functions indicated by the arrows A11 and A12 related to instructions for transmitting a virtual reaction are realized by the transmitting-side module 201A-1. In addition, the sound image localization processing using HRTF data is realized by the server program 101A.

Figure 18:
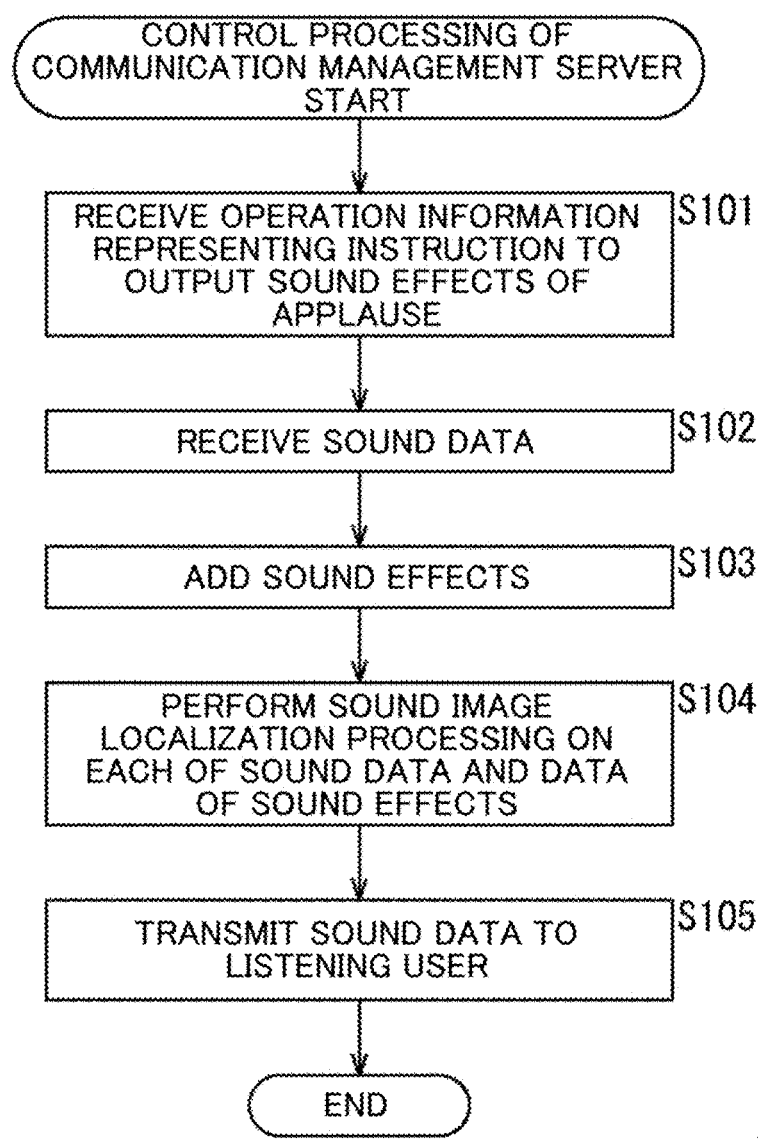
FIG. 18 is a flowchart explaining control processing of the communication management server.

Control processing by the communication management server 1 related to output of sound effects using the virtual reaction function will be described with reference to a flow chart shown in FIG. 18.

Description of contents overlapping with contents described with reference to FIG. 8 among the control processing by the communication management server 1 will be omitted when appropriate. The same applies to FIG. 21 and the like to be described below.

In step S101, the system sound managing unit 136 (FIG. 11) receives operation information representing that an instruction to output sound effects of applause has been issued. When a user depresses the virtual reaction button 301, operation information representing that an instruction to output sound effects of applause has been issued is transmitted from the client terminal 2 used by the user. The transmission of the operation information is performed by, for example, the user state recognizing unit 223 (FIG. 14) of the client terminal 2.

In step S102, the sound receiving unit 131 receives sound data transmitted from the client terminal 2 used by the uttering user. The sound data received by the sound receiving unit 131 is supplied to the sound image localization processing unit 134 via the signal processing unit 132.

In step S103, the system sound managing unit 136 outputs sound data of sound effects of applause to the sound image localization processing unit 134 and adds the sound data as sound data being an object of sound image localization processing.

In step S104, the sound image localization processing unit 134 reads and acquires, from the HRTF data storage unit 135, HRTF data in accordance with a positional relationship between a position of a listening user and a position of an uttering user and HRTF data in accordance with a positional relationship between a position of a listening user and a position of sound effects of applause. As the position of the sound effects of applause, a prescribed position such as those described above is selected as a position where a sound image of the sound effects of applause is to be localized.

The sound image localization processing unit 134 performs sound image localization processing using the HRTF data for an uttered voice with respect to the sound data of the uttering user and performs sound image localization processing using the HRTF data for sound effects with respect to the sound data of the sound effects of applause.

In step S105, the sound transmitting unit 138 transmits the sound data obtained by the sound image localization processing to the client terminal 2 used by a listening user.

According to the processing described above, at the client terminal 2 used by a listening user, a sound image of the voice of the uttering user and a sound image of sound effects of applause are to be respectively perceived as being localized to prescribed positions.

Instead of respectively performing sound image localization processing with respect to sound data of the uttering user and sound data of the sound effects of applause, sound image localization processing may be performed on composite sound data obtained by compositing the sound data of the sound effects of applause with the sound data of the uttering user. Even in this case, the sound image of the sound effects of applause is to be localized at a same position as the position of the user having issued an instruction to output the sound effects of applause.

According to the processing described above, sound effects of applause which expresses empathy, surprise, or the like of each user can be shared among all of the users as a common sound.

In addition, since a sound image of the sound effects of applause is perceived to be localized at a same position as a position of a user having issued an instruction to output the sound effects of applause or the like, each listening user can intuitively recognize which of the users is exhibiting a reaction such as empathy or surprise.

Output of sound including a mic sound of the uttering user and sound effects of applause may be performed as follows.

(A) As indicated by a destination of an arrow A16 shown in FIG. 17, a mic sound of which a sound quality has been modified by filter processing on the side of the client terminal 2 (the transmitting-side module 201A-1) is transmitted to the communication management server 1. For example, filter processing for changing the sound quality of the mic sound of the uttering user to a sound quality of an elderly person or a sound quality of a child is performed on the mic sound of the uttering user.

(B) A type of sound effects reproduced as a system sound is changed in accordance with the number of users simultaneously issuing an instruction to output sound effects. For example, when the number of users issuing an instruction to output sound effects of applause is equal to or larger than the number of users adopted as a threshold, sound effects representing cheers of a large number of people is reproduced and delivered to listening users instead of the sound effects of applause. Selection of the type of sound effects is performed by the system sound managing unit 136.

With respect to sound effects representing cheers, HRTF data for localizing the sound effects at a prescribed position such as a position near the position of a listening user or a position above or below the position of a listening user is selected and sound image localization processing is performed.

A position where a sound image of sound effects is to be localized may be changed or a volume may be changed in accordance with the number of users simultaneously issuing an instruction to output sound effects.

Functions for communicating reactions other than applause such as a function for expressing joy or a function for expressing anger may be prepared as virtual reaction functions. Different sound data is reproduced and output as sound effects for each type of reaction. A position where a sound image is to be localized may be changed for each type of reaction.

<Whispering Function>

A whispering function is a function of designating a single user as a listening user and making an utterance. The voice of the uttering user is to be delivered only to the designated user and is not delivered to other users. Delivery of a voice to a single user using the whispering function is designated from a screen displayed as a GUI on the display 207 of the client terminal 2.

Figure 19:
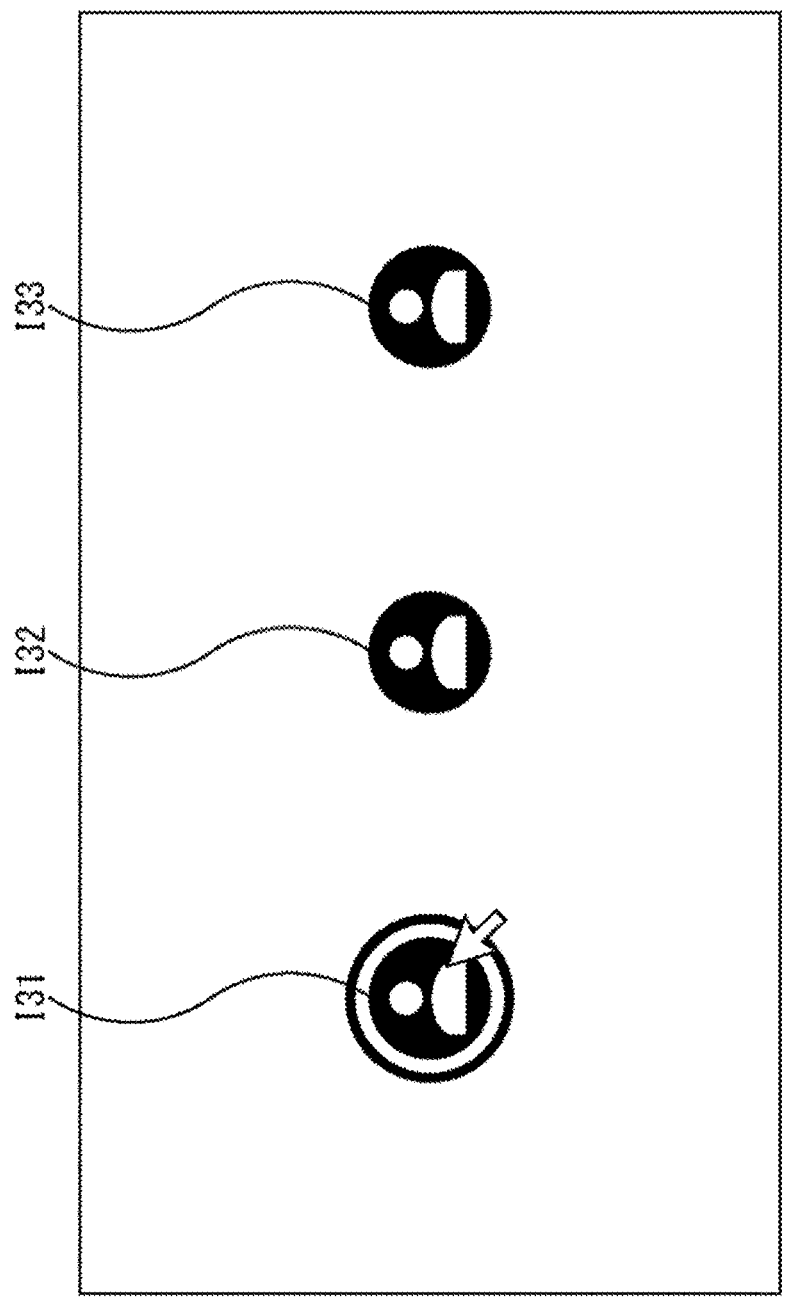
FIG. 19 is a diagram showing an example of a remote conference screen.

FIG. 19 is a diagram showing an example of a remote conference screen.

In a similar manner to the screen described with reference to FIG. 15, the remote conference screen displays participant icons I31 to I33 representing users participating in a conference. Assuming that the remote conference screen shown in FIG. 19 is a screen displayed on the client terminal 2A used by the user A, the participant icons I31 to I33 respectively represent users B to D.

For example, when the participant icon I31 is selected by the user A using a cursor, a state is created where the user B is designated as a whisper-object user who is a listening destination of a voice. The participant icon I31 representing the user B is highlighted as shown in FIG. 19.

When the user A makes an utterance in this state, in the communication management server 1, sound image localization processing for localizing a sound image in the ears of the user B designated as a whisper-object user is performed with respect to sound data of the user A.

Note that a default state is a state where a whisper-object user has not been designated. The voice of the uttering user is delivered to all other users so that a sound image is localized at a position in accordance with a positional relationship between the listening users and the uttering user.

Figure 20:
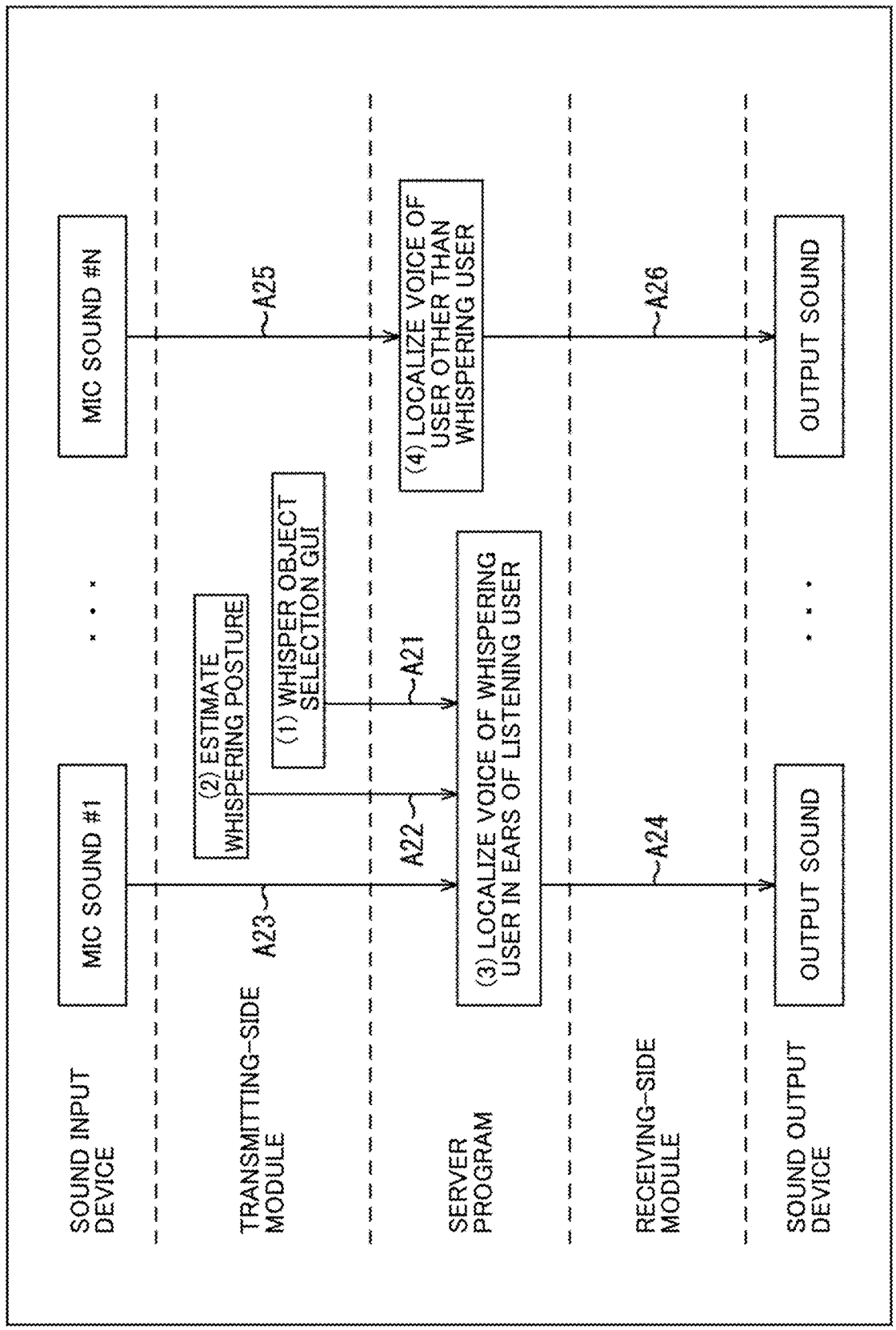
FIG. 20 is a diagram showing a flow of processing related to output of a voice using a whispering function.

FIG. 20 is a diagram showing a flow of processing related to output of a voice using the whispering function.

When a whisper-object user is designated by selecting a participant icon, operation information representing that a whisper-object user has been designated is transmitted from the client terminal 2 to the communication management server 1 as indicated by an arrow A21.

Operation information representing that a whisper-object user has been designated may be transmitted as indicated by an arrow A22 in accordance with an image photographed by a camera being analyzed and a posture of whispering in one's ears being estimated.

As indicated by an arrow A23, when a mic sound is transmitted from the client terminal 2 used by a whispering user, in the communication management server 1, sound image localization processing for localizing a sound image in the ears of the user designated as a whisper-object user is performed with respect to sound data of the mic sound #1. In other words, HRTF data in accordance with a position of the ears of the user designated as a whisper-object user is selected and used in sound image localization processing.

In FIG. 20, the mic sound #1 indicated by the arrow A23 is a voice of the whispering user or, in other words, the uttering user having designated a single user as a whisper-object user using the whispering function.

The sound data generated by the sound image localization processing is transmitted to the client terminal 2 used by the whisper-object user and output from the client terminal 2 as indicated by an arrow A24.

On the other hand, as indicated by an arrow A25, when a mic sound is transmitted from the client terminal 2 used by a user not using the whispering function, in the communication management server 1, sound image localization processing is performed using HRTF data in accordance with a positional relationship between a listening user and an uttering user.

Sound data generated by sound image localization processing is transmitted to the client terminal 2 used by a listening user and output from the client terminal 2 as indicated by an arrow A26.

In the present example, when a whisper-object user is instructed by a specific user, HRTF data for localizing a sound image of a voice of a user using the whispering function in the ears of the whisper-object user is selected in accordance with an action such as execution of the whispering function. In addition, based on sound data obtained by sound image localization processing using the selected HRTF data, a voice of a user using the whispering function is provided to the whisper-object user as a sound content.

Figure 21:
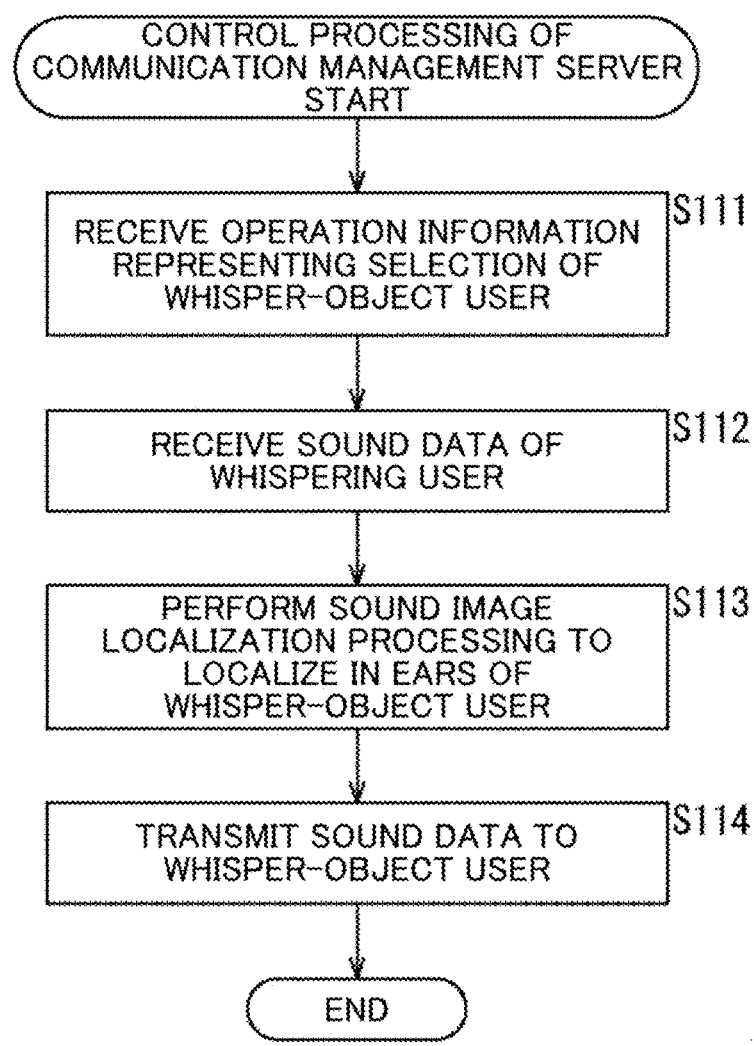
FIG. 21 is a flowchart explaining control processing of the communication management server.

Control processing by the communication management server 1 related to output of a voice using the whispering function will be described with reference to the flow chart shown in FIG. 21.

In step S111, the system sound managing unit 136 receives operation information representing a selection of a whisper-object user. When a given user selects a whisper-object user, operation information representing the selection of a whisper-object user is transmitted from the client terminal 2 used by the given user. Transmission of the operation information is performed by, for example, the user state recognizing unit 223 of the client terminal 2.

In step S112, the sound receiving unit 131 receives sound data transmitted from the client terminal 2 used by the whispering user. The sound data received by the sound receiving unit 131 is supplied to the sound image localization processing unit 134.

In step S113, the sound image localization processing unit 134 reads and acquires HRTF data in accordance with the position of the ears of the whisper-object user from the HRTF data storage unit 135. In addition, the sound image localization processing unit 134 performs sound image localization processing using the HRTF data with respect to sound data of the uttering user (the whispering user) so that a sound image is localized in the ears of the whisper-object user.

In step S114, the sound transmitting unit 138 transmits the sound data obtained by the sound image localization processing to the client terminal 2 used by the whisper-object user.

The client terminal 2 used by the whisper-object user outputs a voice of the whispering user based on the sound data transmitted from the communication management server 1. The user selected as a whisper-object is to hear the voice of the whispering user while perceiving a sound image in his/her ears.

According to the processing described above, even when a conference has a plurality of participants, an uttering user can designate a single user and talk to only the designated user.

A plurality of users may be designated as whisper-object users.

In addition, with respect to a user (listening user) selected as a whisper-object, voices of other users simultaneously making utterances may be delivered together with the voice of the whispering user. In this case, with respect to the sound data of the whispering user, sound image localization processing is performed so that a sound image is localized in the ears of the listening user. Furthermore, with respect to sound data of other users who are not whispering, sound image localization processing using HRTF data in accordance with a positional relationship between a position of a listening user and a position of the uttering user is performed.

A sound image of the voice of the whispering user can be localized at an arbitrary position in a vicinity of a whisper-object user instead of in the ears of the whisper-object user. The whispering user may be made capable of designating a position where a sound image is to be localized.

<Focusing Function>

A focusing function is a function of designating a single user as a focus object and making a voice of the designated user more audible. Compared to the whispering function described above being a function used by a user on the uttering side, the focusing function is a function being used by a user on the listening side. A focus-object user is designated from a screen displayed as a GUI on the display 207 of the client terminal 2.

Figure 22:
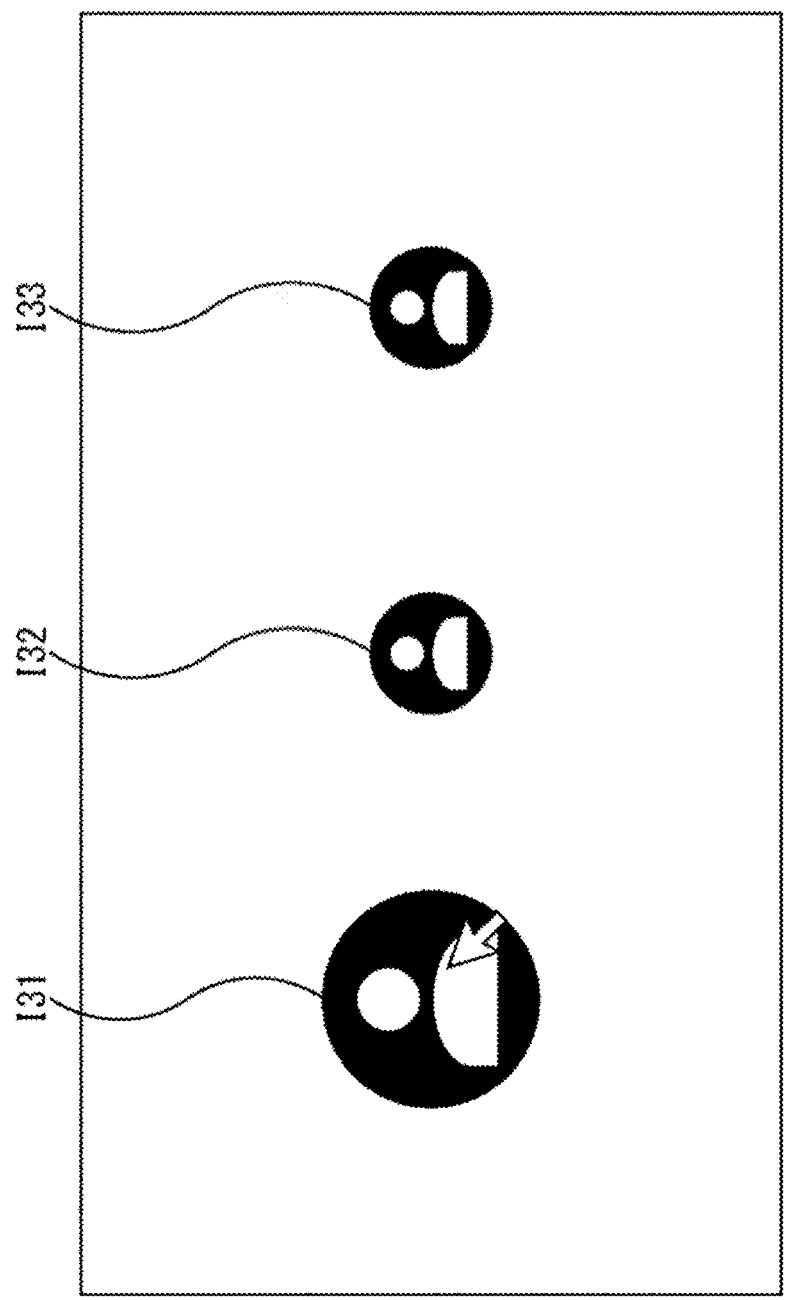
FIG. 22 is a diagram showing an example of a remote conference screen.

FIG. 22 is a diagram showing an example of a remote conference screen.

In a similar manner to the screen described with reference to FIG. 15, the remote conference screen displays participant icons 131 to 133 representing users participating in a conference. Assuming that the remote conference screen shown in FIG. 22 is a screen displayed on the client terminal 2A used by the user A, the participant icons 131 to 133 respectively represent users B to D.

For example, when the participant icon 131 is selected by the user A using a cursor, a state is created where the user B is designated as a focus-object user. The participant icon 131 representing the user B is highlighted as shown in FIG. 22.

When the user B makes an utterance in this state, in the communication management server 1, sound image localization processing for localizing a sound image near the user A having designated the user B as a focus-object user is performed with respect to sound data of the user B. When the user C and the user D who are not designated as focus objects make utterances, sound image localization processing using HRTF data in accordance with a positional relationship with the user A is respectively performed with respect to sound data of the user C and sound data of the user D.

Note that a default state is a state where a focus-object user has not been designated. The voice of the uttering user is delivered to all other users so that a sound image is localized at a position in accordance with a positional relationship between the listening users and the uttering user.

Figure 23:
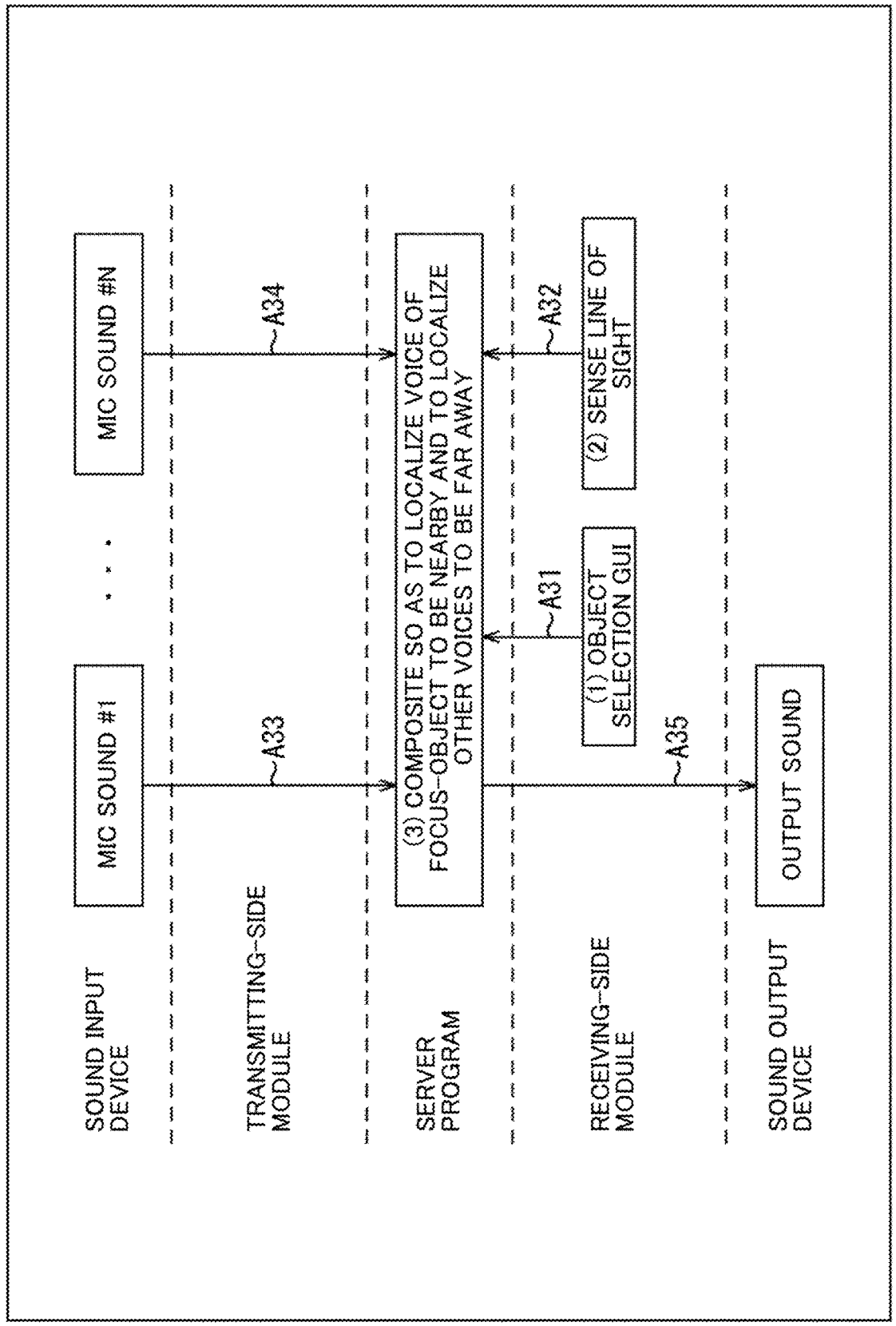
FIG. 23 is a diagram showing a flow of processing related to output of a voice using a focusing function.

FIG. 23 is a diagram showing a flow of processing related to output of a voice using the focusing function.

When a focus-object user is designated by selecting a participant icon, operation information representing that a focus-object user has been designated is transmitted from the client terminal 2 to the communication management server 1 as indicated by an arrow A31.

Operation information representing that a focus-object user has been designated may be transmitted as indicated by an arrow A32 in accordance with an image photographed by a camera being analyzed and a focus-object being estimated based on a detection of a line of sight or the like.

As indicated by arrows A33 and A34, when a mic sound is transmitted from the client terminal 2, in the communication management server 1, sound image localization processing for localizing a sound image near a user is performed with respect to sound data of a mic sound of the focus-object user. In other words, HRTF data in accordance with a position of the user having designated a focus object is selected and used in sound image localization processing.

In addition, with respect to sound data of a mic sound of a user other than the focus-object user, sound image localization processing for localizing a sound image at a position distant from the user is performed. In other words, HRTF data in accordance with a position distant from the user having designated the focus object is selected and used in sound image localization processing.

In the example shown in FIG. 23, for example, a mic sound #1 indicated by the arrow A33 is a mic sound of a focus-object user. Sound data of the mic sound #1 is transmitted from the client terminal 2 used by the focus-object user to the communication management server 1.

In addition, a mic sound #N indicated by the arrow A34 is a mic sound of a user other than the focus-object user. Sound data of the mic sound #N is transmitted from the client terminal 2 used by the user other than the focus-object user to the communication management server 1.

Sound data generated by sound image localization processing is transmitted to the client terminal 2 used by the user having designated a focus object and output from the client terminal 2 as indicated by an arrow A35.

In the present example, when a focus-object user is selected by a specific user, HRTF data for localizing a sound image of a voice of the focus-object user near the user having selected the focus object is selected in accordance with an action such as execution of the focusing function. In addition, based on sound data obtained by sound image localization processing using the selected HRTF data, a voice of the focus-object user is provided to the user having selected the focus object as a sound content.

Figure 24:
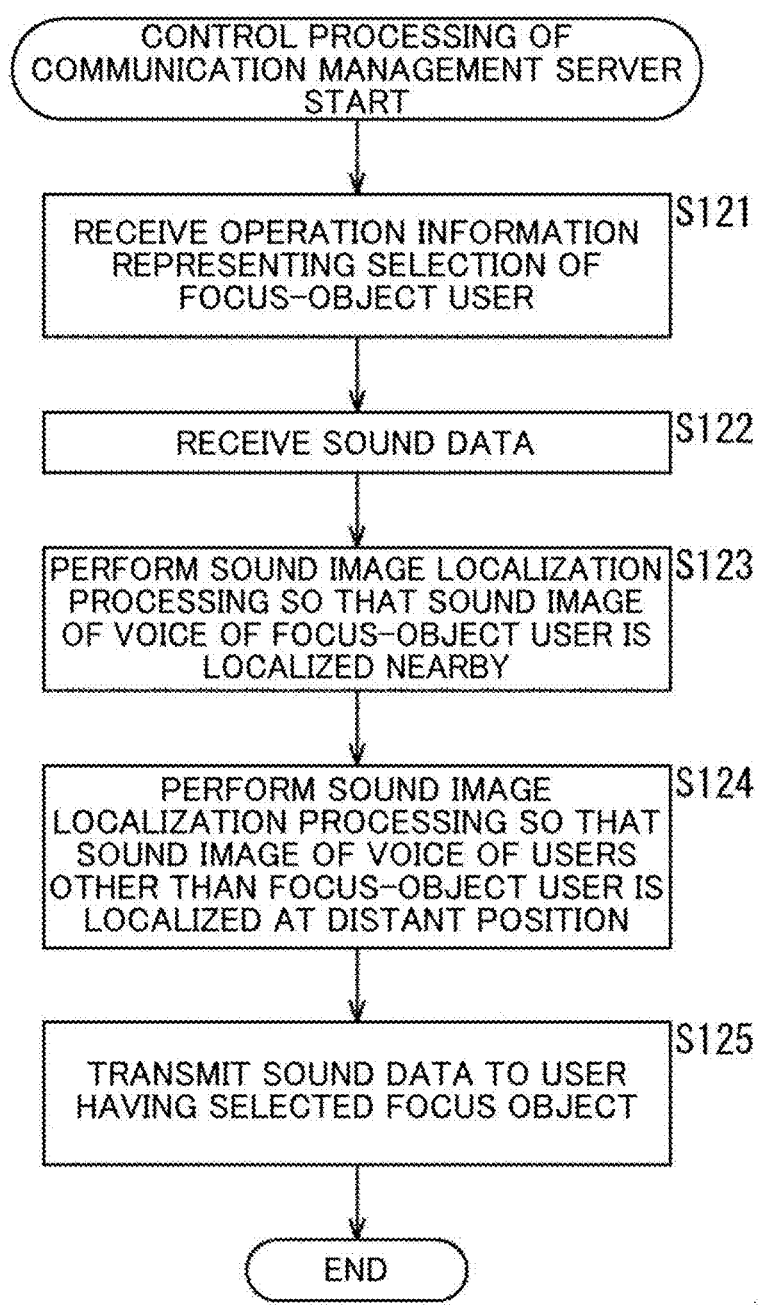
FIG. 24 is a flowchart explaining control processing of the communication management server.

Control processing by the communication management server 1 related to output of a voice using the focusing function will be described with reference to the flow chart shown in FIG. 24.

In step S121, the participant information managing unit 133 receives operation information representing a selection of a focus-object user. When a given user selects a focus-object user, operation information representing a selection of the focus-object user is transmitted from the client terminal 2 used by the given user. Transmission of the operation information is performed by, for example, the user state recognizing unit 223 of the client terminal 2.

In step S122, the sound receiving unit 131 receives sound data transmitted from the client terminal 2. For example, sound data of users other than the focus-object user (users not selected as a focus object) is received together with sound data of the focus-object user. The sound data received by the sound receiving unit 131 is supplied to the sound image localization processing unit 134.

In step S123, the sound image localization processing unit 134 reads and acquires HRTF data in accordance with a position near the user having selected a focus object from the HRTF data storage unit 135. In addition, the sound image localization processing unit 134 performs sound image localization processing using the acquired HRTF data with respect to sound data of the focus-object user so that a sound image is localized near the user having selected a focus object.

In step S124, the sound image localization processing unit 134 reads and acquires HRTF data in accordance with a position distant from the user having selected a focus object from the HRTF data storage unit 135. In addition, the sound image localization processing unit 134 performs sound image localization processing using the acquired HRTF data with respect to sound data of a user other than the focus-object user so that a sound image is localized at a position distant from the user having selected a focus object.

In step S125, the sound transmitting unit 138 transmits the sound data obtained by the sound image localization processing to the client terminal 2 used by the user having selected a focus object.

The client terminal 2 used by the user having selected a focus object outputs a voice of the uttering user based on the sound data transmitted from the communication management server 1. The user having selected a focus object is to hear the voice of the focus-object user while perceiving a sound image nearby. In addition, the user having selected a focus object is to hear the voice of users other than the focus-object user while perceiving a sound image at distant positions.

According to the processing described above, even when a conference has a plurality of participants, a user can designate a single user and listen to utterances by the designated user in a focused manner.

A plurality of users may be selectable as focus-object users.

A user to be distanced may be selected instead of selecting a focus-object user. In this case, with respect to sound data of a voice of a user selected as a user to be distanced, sound image localization processing is performed so that a sound image is localized at a position distant from a listening user.

<Dynamic Switching of Sound Image Localization Processing>

Sound image localization processing which is processing of object audio including rendering is dynamically switched between being performed on the side of the communication management server 1 and being performed on the side of the client terminal 2.

In this case, the client terminal 2 is to be also provided with components similar to at least the sound image localization processing unit 134, the HRTF data storage unit 135, and the 2-ch mix processing unit 137 among the components of the communication management server 1 shown in FIG. 11. The components similar to the sound image localization processing unit 134, the HRTF data storage unit 135, and the 2-ch mix processing unit 137 are realized by, for example, the receiving-side module 201A-2.

When a setting of a parameter used in sound image localization processing such as positional information of a listening user is to be changed in the middle of a conference and the change is to be reflected on the sound image localization processing in real time, the sound image localization processing is performed on the side of the client terminal 2. Locally performing sound image localization processing enables a quicker response to be made to a change in the parameter.

On the other hand, when there is no setting change in a parameter for a certain amount of time or longer, the sound image localization processing is performed on the side of the communication management server 1. Performing sound image localization processing on a server enables a data communication amount between the communication management server 1 and the client terminal 2 to be suppressed.

Figure 25:
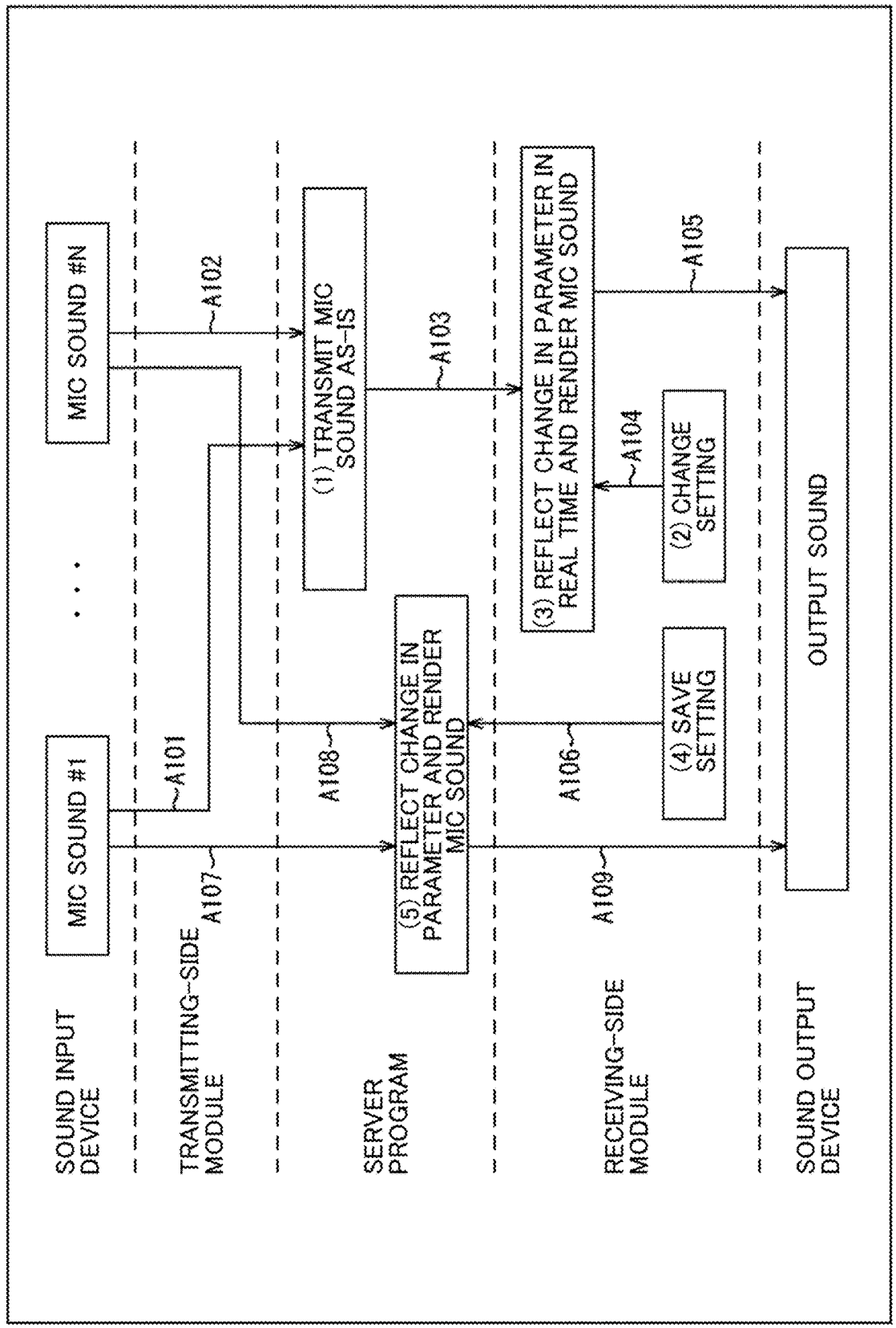
FIG. 25 is a diagram showing a flow of processing related to dynamic switching of sound image localization processing.

FIG. 25 is a diagram showing a flow of processing related to dynamic switching of sound image localization processing.

When sound image localization processing is to be performed on the side of the client terminal 2, a mic sound transmitted from the client terminal 2 as indicated by arrows A101 and A102 is transmitted to the client terminal 2 as-is as indicated by an arrow A103. The client terminal 2 to be a transmission source of the mic sound is the client terminal 2 used by the uttering user, and the client terminal 2 to be a transmission destination of the mic sound is the client terminal 2 used by a listening user.

When a setting of a parameter related to localization of a sound image such as a position of a listening user is changed by the listening user as indicated by an arrow A104, sound image localization processing is performed with respect to the mic sound transmitted from the communication management server 1 while reflecting the change to the setting in real time.

A sound in accordance with sound data generated by sound image localization processing on the side of the client terminal 2 is output as indicated by an arrow A105.

In the client terminal 2, changed contents of the setting of the parameter are saved and information representing the changed contents is transmitted to the communication management server 1 as indicated by an arrow A106.

When sound image localization processing is to be performed on the side of the communication management server 1, with respect to a mic sound transmitted from the client terminal 2 as indicated by arrows A107 and A108, sound image localization processing is performed while reflecting the parameter after the change.

The sound data generated by the sound image localization processing is transmitted to the client terminal 2 used by the listening user as indicated by an arrow A109 and output from the client terminal 2.

Figure 26:
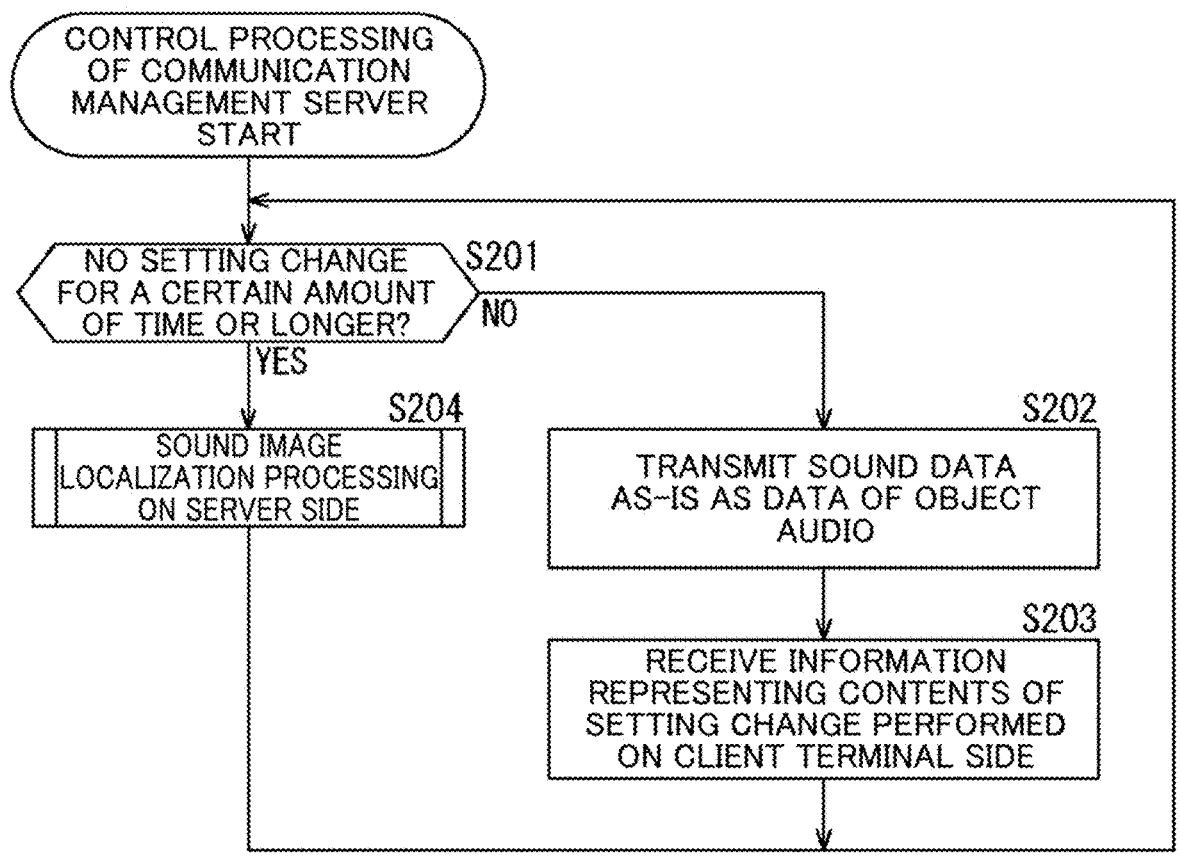
FIG. 26 is a flowchart explaining control processing of the communication management server.

Control processing by the communication management server 1 related to dynamic switching of sound image localization processing will be described with reference to a flow chart shown in FIG. 26.

In step S201, a determination is made as to whether or not a setting change of a parameter has not been made for a certain amount of time or longer. The determination is made by the participant information managing unit 133 based on, for example, information transmitted from the client terminal 2 used by a listening user.

When it is determined in step S201 that there has been a setting change of a parameter, in step S202, the sound transmitting unit 138 transmits sound data of the uttering user received by the participant information managing unit 133 to the client terminal 2 used by a listening user as-is. The transmitted sound data becomes data of an object audio.

In the client terminal 2, sound image localization processing is performed using a setting after the change and output of a sound is performed. In addition, information representing contents of the setting after the change is transmitted to the communication management server 1.

In step S203, the participant information managing unit 133 receives information representing contents of the setting change transmitted from the client terminal 2. After update of positional information of the listening user or the like is performed based on information transmitted from the client terminal 2, a return is made to step S201 and processing of step S201 and subsequent steps is performed. The sound image localization processing performed on the side of the communication management server 1 is performed based on the positional information after the update.

On the other hand, when it is determined in step S201 that there is no setting change of a parameter, in step S204, sound image localization processing on the side of the communication management server 1 is performed. The processing performed in step S204 is basically similar to the processing described earlier with reference to FIG. 8.

The processing steps described above are performed not only when a position is changed but also when other parameters such as a setting of background sound are changed.

<Management of Acoustic Settings>

Acoustic settings suitable for background sound may be made into a database to be managed by the communication management server 1. For example, for each type of background sound, a position suitable as a position for localizing a sound image is set and HRTF data in accordance with the set position is stored. A parameter related to other acoustic settings such as reverb may be stored.

FIG. 27 is a diagram showing a flow of processing related to management of acoustic settings.

When compositing background sound to a voice of an uttering user, in the communication management server 1, the background sound is reproduced and sound image localization processing is performed using an acoustic setting such as HRTF data suitable for the background sound as indicated by an arrow A121.

The sound data generated by the sound image localization processing is transmitted to the client terminal 2 used by the listening user as indicated by an arrow A122 and output from the client terminal 2.

Modifications

While a conversation carried out by a plurality of users has been described as a conversation during a remote conference, the technique described above can be applied to various kinds of conversations such as a conversation during a meal or a conversation during a lecture as long as the conversation has a plurality of online participants.

Program

The series of processing described above can also be executed by hardware or software. In a case where the series of processing is executed by software, a program constituting the software is to be installed on a computer built into dedicated hardware, a general-purpose personal computer, or the like.

The installed program is provided by being recorded in the removable medium 111 shown in FIG. 10 which is made of an optical disc (a CD-ROM (Compact Disc-Read Only Memory), a DVD (Digital Versatile Disc), or the like), a semiconductor memory, or the like. In addition, the program may be provided through a wired or wireless transmission medium such as a local area network, the Internet, or digital broadcasting. The program can be installed in the ROM 102 or the storage unit 108 in advance.

Note that the program executed by a computer may be a program for performing processing chronologically in the order described in the present specification or may be a program for performing processing in parallel or at a necessary timing such as a called time.

In the present specification, a system means a set of a plurality of constituent elements (apparatuses, modules (components), or the like) and all the constituent elements may or may not be included in a same casing. Accordingly, a plurality of apparatuses accommodated in separate casings and connected via a network and a single apparatus in which a plurality of modules are accommodated in a single casing both constitute systems.

The advantageous effects described in the present specification are merely examples and are not intended as limiting, and other advantageous effects may be obtained.

Embodiments of the present technique are not limited to the embodiment described above and various modifications may be made without departing from the gist of the present technique. While the use of headphones or a speaker as the sound output device has been described, other devices may be used. For example, regular earphones (inner earphones) or open earphones capable of capturing environmental sound can be used as the sound output device.

For example, the present technique may be configured as cloud computing in which a plurality of apparatuses share and cooperatively process one function via a network.

In addition, each step described in the flowcharts presented above can be executed by one apparatus or executed in a shared manner by a plurality of apparatuses.

Furthermore, in a case in which one step includes a plurality of processing steps, the plurality of processing steps included in the one step can be executed by one apparatus or executed in a shared manner by a plurality of apparatuses.

Combination Examples of Configurations The present technique can be configured as follows.

(1) An information processing apparatus, including:
a storage unit configured to store HRTF data corresponding to a plurality of positions based on a listening position; and
a sound image localization processing unit configured to provide, by performing sound image localization processing using the HRTF data selected in accordance with an action by a specific participant among participants of a conversation having participated via a network, a sound content selected in accordance with the action so that a sound image is localized at a prescribed position.

(2) The information processing apparatus according to (1), wherein the sound image localization processing unit is configured to provide the sound content for outputting sound effects in accordance with the action instructing output of the sound effects being performed by the specific participant.

(3) The information processing apparatus according to (2), wherein the sound image localization processing unit is configured to perform the sound image localization processing on sound data of the effect person using the HRTF data in accordance with a relationship between a position of the participant to be a listener and a position of the specific participant having performed the action in a virtual space.

(4) The information processing apparatus according to (1), wherein the sound image localization processing unit is configured to provide the sound content for outputting a voice of the specific participant in accordance with the action for selecting the participant to be a listening destination of a voice being performed by the specific participant.

(5) The information processing apparatus according to (4), wherein selection of the participant to be the listening destination is performed using visual information which is displayed on a screen and which visually represents the participant.

(6) The information processing apparatus according to (4) or (5), wherein the sound image localization processing unit is configured to perform the sound image localization processing with respect to sound data of the specific participant using the HRTF data in accordance with a position of ears of the participant to be the listening destination in a virtual space.

(7) The information processing apparatus according to (1), wherein the sound image localization processing unit is configured to provide the sound content for outputting a voice of a focus-object utterer in accordance with the action for selecting the focus-object utterer being performed by the specific participant.

(8) The information processing apparatus according to (7), wherein selection of the focus-object utterer is performed using visual information which is displayed on a screen and which visually represents the participant.

(9) The information processing apparatus according to (7) or (8), wherein the sound image localization processing unit is configured to perform the sound image localization processing with respect to sound data of the focus-object utterer using the HRTF data in accordance with a position in a vicinity of a position of the specific participant in a virtual space.

(10) An information processing method, including the steps performed by an information processing apparatus of:
storing HRTF data corresponding to a plurality of positions based on a listening position; and providing, by performing sound image localization processing using the HRTF data selected in accordance with an action by a specific participant among participants of a conversation having participated via a network, a sound content selected in accordance with the action so that a sound image is localized at a prescribed position.

(11) A program causing a computer to execute processing of:
storing HRTF data corresponding to a plurality of positions based on a listening position; and
providing, by performing sound image localization processing using the HRTF data selected in accordance with an action by a specific participant among participants of a conversation having participated via a network, a sound content selected in accordance with the action so that a sound image is localized at a prescribed position.

(12) An information processing terminal, including a sound receiving unit configured to: store HRTF data corresponding to a plurality of positions based on a listening position; receive a sound content obtained by performing sound image localization processing and having been transmitted from an information processing apparatus configured to provide, by performing the sound image localization processing using the HRTF data selected in accordance with an action by a specific participant among participants of a conversation having participated via a network, the sound content selected in accordance with the action so that a sound image is localized at a prescribed position; and output a sound.

(13) The information processing terminal according to (12), wherein the sound receiving unit is configured to receive sound data of sound effects transmitted in accordance with the action instructing output of the sound effects being performed by the specific participant.

(14) The information processing terminal according to (13), wherein the sound receiving unit is configured to receive sound data of the effect person obtained by performing the sound image localization processing using the HRTF data in accordance with a relationship between a position of a user of the information processing terminal and a position of the specific user having performed the action in a virtual space.

(15) The information processing terminal according to (12), wherein the sound receiving unit is configured to receive sound data of the specific participant transmitted in accordance with the action for selecting the user of the information processing terminal as the participant to be a listening destination of a sound being performed by the specific participant.

(16) The information processing terminal according to (15), wherein the sound receiving unit is configured to receive sound data of the specific participant obtained by performing the sound image localization processing using the HRTF data in accordance with a position of ears of the user of the information processing terminal in a virtual space.

(17) The information processing terminal according to (12), wherein the sound receiving unit is configured to receive sound data of a focus-object utterer transmitted in accordance with the action for selecting the focus-object utterer being performed by the user of the information processing terminal as the specific participant.

(18) The information processing terminal according to (17), wherein the sound receiving unit is configured to receive sound data of the focus-object utterer obtained by performing the sound image localization processing using the HRTF data in accordance with a position in a vicinity of a position of the user of the information processing terminal in a virtual space.

(19) An information processing method, including the steps performed by an information processing terminal of:
storing HRTF data corresponding to a plurality of positions based on a listening position; receiving a sound content obtained by performing sound image localization processing and having been transmitted from an information processing apparatus which provides, by performing the sound image localization processing using the HRTF data selected in accordance with an action by a specific participant among participants of a conversation having participated via a network, the sound content selected in accordance with the action so that a sound image is localized at a prescribed position; and outputting a sound.

(20) A program causing a computer to execute processing of:
storing HRTF data corresponding to a plurality of positions based on a listening position; receiving a sound content obtained by performing sound image localization processing and having been transmitted from an information processing apparatus which provides, by performing the sound image localization processing using the HRTF data selected in accordance with an action by a specific participant among participants of a conversation having participated via a network, the sound content selected in accordance with the action so that a sound image is localized at a prescribed position; and outputting a sound.

REFERENCE SIGNS LIST

1 Communication management server
2A to 2D Client terminal
121 Information processing unit
131 Sound receiving unit
132 Signal processing unit
133 Participant information managing unit
134 Sound image localization processing unit
135 HRTF data storage unit
136 System sound managing unit
137 2-ch mix processing unit
138 Sound transmitting unit
201 Control unit
211 Information processing unit
221 Sound processing unit
222 Setting information transmitting unit
223 User state recognizing unit
231 Sound receiving unit
233 Mic sound acquiring unit

The invention claimed is:
1. An information processing apparatus, comprising:
a storage unit configured to store HRTF data corresponding to a plurality of positions based on a listening position; and a sound image localization processing unit configured to provide, by performing sound image localization processing using the HRTF data selected in accordance with an action by a specific participant among participants of a conversation having participated via a network, a sound content selected in accordance with the action so that a sound image is localized at a prescribed position, wherein the sound image localization processing unit is configured to:

provide the sound content for outputting sound effects in accordance with the action instructing output of sound effects being performed by the specific participant, and perform the sound image localization processing on sound data of an effect person using the HRTF data in accordance with a relationship between a position of the participant to be a listener and a position of the specific participant having performed the action in a virtual space.

2. The information processing apparatus according to claim 1, wherein the sound image localization processing unit is configured to provide the sound content for outputting a voice of the specific participant in accordance with the action for selecting the participant to be a listening destination of a voice being performed by the specific participant.

3. The information processing apparatus according to claim 2, wherein selection of the participant to be the listening destination is performed using visual information which is displayed on a screen and which visually represents the participant.

4. The information processing apparatus according to claim 2, wherein the sound image localization processing unit is configured to perform the sound image localization processing with respect to sound data of the specific participant using the HRTF data in accordance with a position of ears of the participant to be the listening destination in a virtual space.

5. The information processing apparatus according to claim 1, wherein the sound image localization processing unit is configured to provide the sound content for outputting a voice of a focus-object utterer in accordance with the action for selecting the focus-object utterer being performed by the specific participant.

6. The information processing apparatus according to claim 5, wherein selection of the focus-object utterer is performed using visual information which is displayed on a screen and which visually represents the participant.

7. The information processing apparatus according to claim 5, wherein the sound image localization processing unit is configured to perform the sound image localization processing with respect to sound data of the focus-object utterer using the HRTF data in accordance with a position in a vicinity of a position of the specific participant in a virtual space.

8. An information processing method, comprising the steps performed by an information processing apparatus of;
storing HRTF data corresponding to a plurality of positions based on a listening position; and
providing, by performing sound image localization processing using the HRTF data selected in accordance with an action by a specific participant among participants of a conversation having participated via a network, a sound content selected in accordance with the action so that a sound image is localized at a prescribed position, wherein the sound image localization processing is configured to:
provide the sound content for outputting sound effects in accordance with the action instructing output of sound effects being performed by the specific participant, and
perform the sound image localization processing on sound data of an effect person using the HRTF data in accordance with a relationship between a position of the participant to be a listener and a position of the specific participant having performed the action in a virtual space.

9. A non-transitory computer readable medium storing instructions that, when executed by a computer, cause the computer to execute the processes of:
storing HRTF data corresponding to a plurality of positions based on a listening position; and
providing, by performing sound image localization processing using the HRTF data selected in accordance with an action by a specific participant among participants of a conversation having participated via a network, a sound content selected in accordance with the action so that a sound image is localized at a prescribed position, wherein the sound image localization processing is configured to:
provide the sound content for outputting sound effects in accordance with the action instructing output of sound effects being performed by the specific participant, and
perform the sound image localization processing on sound data of an effect person using the HRTF data in accordance with a relationship between a position of the participant to be a listener and a position of the specific participant having performed the action in a virtual space.

10. An information processing terminal, comprising a sound receiving unit configured to:
store HRTF data corresponding to a plurality of positions based on a listening position; receive a sound content obtained by performing sound image localization processing and having been transmitted from an information processing apparatus configured to provide, by performing the sound image localization processing using the HRTF data selected in accordance with an action by a specific participant among participants of a conversation having participated via a network, the sound content selected in accordance with the action so that a sound image is localized at a prescribed position; receive sound data of sound effects transmitted in accordance with the action instructing output of the sound effects being performed by the specific participant; receive sound data of an effect person obtained by performing the sound image localization processing using the HRTF data in accordance with a relationship between a position of a user of the information processing terminal and a position of the specific user having performed the action in a virtual space; and
output a sound.

11. The information processing terminal according to claim 10, wherein the sound receiving unit is configured to receive sound data of the specific participant transmitted in accordance with the action for selecting the user of the information processing terminal as the participant to be a listening destination of a sound being performed by the specific participant.

12. The information processing terminal according to claim 11, wherein the sound receiving unit is configured to receive sound data of the specific participant obtained by performing the sound image localization processing using the HRTF data in accordance with a position of ears of the user of the information processing terminal in a virtual space.

13. The information processing terminal according to claim 10, wherein the sound receiving unit is configured to receive sound data of a focus-object utterer transmitted in accordance with the action for selecting the focus-object utterer being performed by the user of the information processing terminal as the specific participant.

14. The information processing terminal according to claim 13, wherein the sound receiving unit is configured to receive sound data of the focus-object utterer obtained by performing the sound image localization processing using the HRTF data in accordance with a position in a vicinity of a position of the user of the information processing terminal in a virtual space.

15. An information processing method, comprising the steps performed by an information processing terminal of:

storing HRTF data corresponding to a plurality of positions based on a listening position; receiving a sound content obtained by performing sound image localization processing and having been transmitted from an information processing apparatus which provides, by performing the sound image localization processing using the HRTF data selected in accordance with an action by a specific participant among participants of a conversation having participated via a network, the sound content selected in accordance with the action so that a sound image is localized at a prescribed position; receiving sound data of sound effects transmitted in accordance with the action instructing output of sound effects being performed by the specific participant; receiving sound data of an effect person obtained by performing the sound image localization processing using the HRTF data in accordance with a relationship between a position of a user of the information processing terminal and a position of the specific user having performed the action in a virtual space; and outputting a sound.

16. A non-transitory computer readable medium storing instructions that, when executed by a computer, cause the computer to execute the processes of:

storing HRTF data corresponding to a plurality of positions based on a listening position; receiving a sound content obtained by performing sound image localization processing and having been transmitted from an information processing apparatus which provides, by performing the sound image localization processing using the HRTF data selected in accordance with an action by a specific participant among participants of a conversation having participated via a network, the sound content selected in accordance with the action so that a sound image is localized at a prescribed position; receiving sound data of sound effects transmitted in accordance with the action instructing output of sound effects being performed by the specific participant; receiving sound data of an effect person obtained by performing the sound image localization processing using the HRTF data in accordance with a relationship between a position of a user of the information processing terminal and a position of the specific user having performed the action in a virtual space; and outputting a sound.

* * * * *